United States Patent
Peters et al.

(10) Patent No.: US 9,611,385 B2
(45) Date of Patent: Apr. 4, 2017

(54) ULTRAFINE POLY(PHENYLENE ETHER) PARTICLES AND COMPOSITIONS DERIVED THEREFROM

(75) Inventors: Edward Norman Peters, Lenox, MA (US); Scott Michael Fisher, Delmar, NY (US)

(73) Assignee: SABIC Global Technologies B.V., Pittsfield, MA (US)

(*) Notice: Subject to any disclaimer, the term of this patent is extended or adjusted under 35 U.S.C. 154(b) by 668 days.

(21) Appl. No.: 13/538,295

(22) Filed: Jun. 29, 2012

(65) Prior Publication Data
US 2014/0005340 A1    Jan. 2, 2014

(51) Int. Cl.
*C08L 63/00* (2006.01)
*C08L 71/12* (2006.01)
*C08G 59/50* (2006.01)

(52) U.S. Cl.
CPC .............. *C08L 63/00* (2013.01); *C08G 59/50* (2013.01)

(58) Field of Classification Search
CPC ................................. C08L 63/00; C08G 59/50
USPC .......................................... 525/396; 523/440
See application file for complete search history.

(56) References Cited

U.S. PATENT DOCUMENTS

| 5,087,657 A | 2/1992 | Qureshi et al. |
| 5,834,565 A | 11/1998 | Tracy et al. |
| 6,576,718 B1* | 6/2003 | Yeager et al. ................ 525/523 |
| 2003/0018131 A1* | 1/2003 | Davis ...................... C08L 63/00 525/107 |
| 2003/0236361 A1 | 12/2003 | Yeager et al. |
| 2005/0228087 A1* | 10/2005 | Murakami ........... C08K 5/5399 524/115 |
| 2006/0018131 A1* | 1/2006 | Kim ............................ 362/634 |

FOREIGN PATENT DOCUMENTS

| CA | 2048079 | 1/1993 |
| JP | 2001019839 A | 1/2001 |
| JP | 2005105009 A | 4/2005 |
| JP | 2008050526 | 3/2008 |

OTHER PUBLICATIONS

Sabic, "PPO Resin 640", 2015.*
International Search Report for PCT/US2012/069335, mailed Apr. 26, 2013.
Hendrick, J. C., Patel, N. M., and Mc Grath, J. E. in Toughened Plastics I, edited by C. K. Riew, and A. J. Kinloch, Advances in Chemistry Series, 233, Amer. Chem. Soc., Washington DC, Chapter 11 (1993).

(Continued)

*Primary Examiner* — David Karst
(74) *Attorney, Agent, or Firm* — Honigman Miller Schwarts and Cohn LLP; Heidi M. Berven

(57) ABSTRACT

Disclosed are compositions comprising:
(a) 10 to 40 percent by weight of the ultrafine particulate poly(phenylene ether), wherein the mean particle size of the poly(phenylene ether) is 9 microns or less;
(b) 60 to 90 percent by weight of an epoxy resin;
wherein the weight percents are based on the total weight of the composition.
Also disclosed are processes for preparing such compositions as well as articles derived therefrom.

7 Claims, 7 Drawing Sheets

(56) References Cited

OTHER PUBLICATIONS

Raghava, R. S., J. Polym. Sci., Part B, 25, 1017 (1987).
Hodgkin, J. H., Simon, G. P., Varley, R. J., Polym. Adv. Tech., 9, 3 (1998).
Pearson, R. A., Toughened Plastics I, edited by C. K. Riew, and A. J. Kinloch, Advances in Chemistry Series, 233, Amer. Chem. Soc., Washington DC, Chapter 17 (1993).
Ratna, D., Banthia, A. K., Macromolecular Research, 12, 11 (2004).
Bagheri, R., Marouf, B. T., Pearson, R. A., Polymer Reviews, 49 201-225 (2009).
Venderbosch, R. W., et al., Blends of epoxy resin and polyphenylene ether as a matrix material for high-performance composites, 9th International Conference on Deformation, Yield and Fracture of Polymers (1994), pp. 1-4. See abstract.
Bucknall, Clive B., Partridge, Ivana K., Polymer, 24, 639 (1983).
Raghava, R. S., 28th SAMPE Symposium, p. 367 (1983).
Sultan, J. N., Laible, R. C., Mc Garry, F. J., Appl. Potym Symp. 16, 127 (1971).
Mc Garry, F. J. and Rosner, R. B. In Toughened Plastics I, edited by C. K. Riew, and A. J. Kinloch, Advances in Chemistry Series, 233, Amer. Chem. Soc., Washington, DC, Chapter 12 (1993).
SABIC Data Sheet for PPO 640 (http://kbam.geampod.com/kbam/reflection/assets/20423.pdf) (last visited Nov. 14, 2014).

* cited by examiner

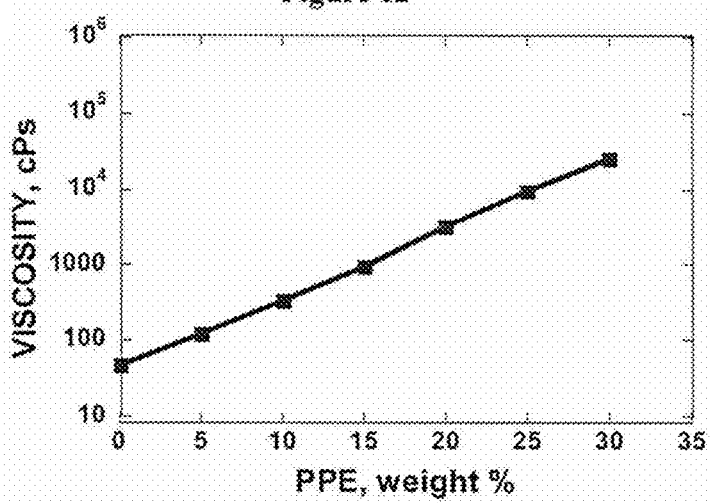
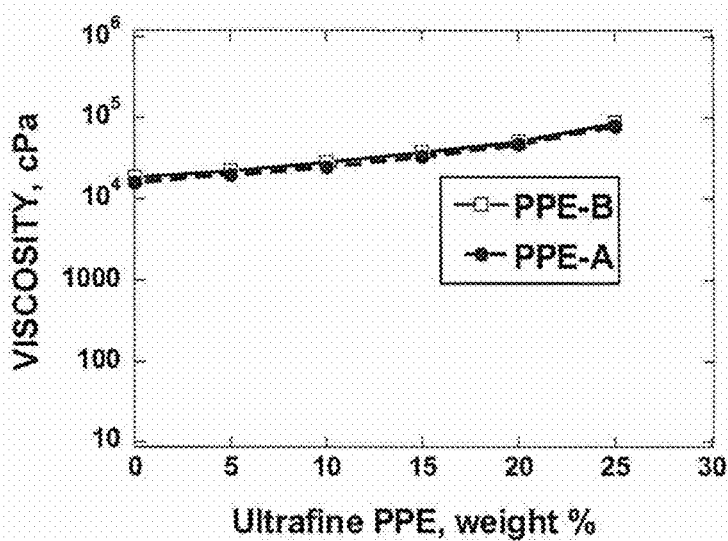

ULTRAFINE POLY(PHENYLENE ETHER) PARTICLES AND COMPOSITIONS DERIVED THEREFROM

FIELD OF THE INVENTION

The invention relates to ultrafine particles of poly(phenylene ether), as well as their preparation and use in thermoset resins and articles derived therefrom.

BACKGROUND

Epoxy resins can be formulated with a number of reagents to modify and enhance their performance. An important focus is on increasing the toughness of cured epoxies. There have been numerous studies on the use of engineering thermoplastics in epoxies for enhancing performance. The major advantage of thermoplastic-modified epoxy resins over elastomeric-modified systems is increased toughness along with no significant decrease in modulus or glass transition temperature (Tg). Performance of the final material is generally determined by the morphology of the material. Two-phase morphologies can be tougher than single-phase morphologies.

In general, the method for making epoxy resins containing thermoplastics involves a "solution process" where the thermoplastic is dissolved in hot epoxy resin to form a homogeneous solution. Phase-separated morphologies can be obtained by temperature induced phase separation and reaction induced phase separation during curing. In temperature-induced phase separation, the onset of phase separation occurs as the temperature is decreased. In reaction-induced phase separation, a second phase forms to produce multiphase morphology as the epoxy resins is curing.

The complexity of the solution process is illustrated in the temperature-composition phase diagrams for PPE (0.40 IV dl/g) epoxy resin (diglycidyl ether of bisphenol A; Epon 828) at 175° C. forming a homogeneous solution as reported by Venderbosch et al. [R. W. Venderbosch, H. E. H. Meijer, P. J. Lemstra, *Polymer,* 35, 4349 1994]. There is the onset of phase separation as indicated by the cloud point curve upon cooling of the solution. Below the cloud point curve, the solution undergoes liquid-liquid phase separation. However, on further cooling the phase-separated solution develops a Tg of approximately 100° C. Another phenomena in the two-phase region, is phase inversion as the PPE content is increased. At low PPE content, epoxy is the predominant material in the continuous phase with predominately PPE in the dispersed phase. In the range around 20 weight percent (wt %) PPE, co-continuous morphology occurs. With greater than 20 wt % PPE, the PPE is the predominant material in the continuous phase and epoxy is the dispersed phase. Terms such as "predominant material" or "PPE-rich" or "epoxy-rich" are used to imply that there is not always complete separation or segregation between the phases.

The temperature-composition phase diagram for a PPE epoxy resin is shown in FIG. 1. As depicted in FIG. 1, a variety of different composition/morphological zones are present. A description of these zones appears in Table 1. The location of the composition and cure temperatures needs to be considered with respect to these various zones. In fully cured epoxies, the thermoplastic can be the dispersed phase, the continuous phase, or can exhibit some level of co-continuous morphology depending on a number of factors.

TABLE 1

| Morphology Zones in phase diagram | | | |
|---|---|---|---|
| | | PPE | Epoxy |
| Zone 1 | Single phase | homogeneous liquid | |
| Zone 2 | Two phases | dispersed liquid phase | continuous liquid phase |
| Zone 3 | Two phases | dispersed solid phase | continuous liquid phase |
| Zone 4 | Two phases | co-continuous | |
| Zone 5 | Two phases | continuous liquid phase | dispersed liquid phase |
| Zone 6 | Two phases | continuous solid phase | dispersed liquid phase |

Because of this morphological complexity, the use of thermoplastics in making epoxy resins can be complicated. As a result, there is a continuing need for materials and processes that can be used to improve epoxy resin toughness.

SUMMARY OF THE INVENTION

These and other needs are met by the present invention, which is directed to the use of ultrafine poly(phenylene ether) particles that can be used to improve epoxy resin toughness, lower the dielectric properties and decrease moisture absorption. Ultrafine poly(phenylene ether) particles are mixed with the epoxy resin at ambient temperatures. The mixture is cured at sufficiently low temperatures so that the engineering thermoplastic does not dissolve in the epoxy resin. The process as described herein eliminates the need for the dissolve-cure-induced phase separation procedure. In addition, the present invention circumvents the huge increase in viscosities associated with dissolving PPE in epoxy resins.

Thus, in one aspect, the invention is directed to a composition comprising:

(a) 10 to 40 percent by weight of the ultrafine particulate poly(phenylene ether), wherein the mean particle size of the poly(phenylene ether) is 9 microns or less;

(b) 60 to 90 percent by weight of an epoxy resin;

wherein the weight percents are based on the total weight of the composition.

In another aspect, the invention is directed to ultrafine PPE particles, compositions for containing such particles, processes for preparing such compositions, as well as articles derived therefrom.

BRIEF DESCRIPTION OF THE FIGURES

FIG. 12 depicts the effect of the dissolved PPE on spindle viscosity at 150° C. for Comparative Example P.

FIG. 13 depicts the effect of the slurried PPE on spindle viscosity at 24° C. for Example 16.

DETAILED DESCRIPTION OF THE INVENTION

Figure 1:
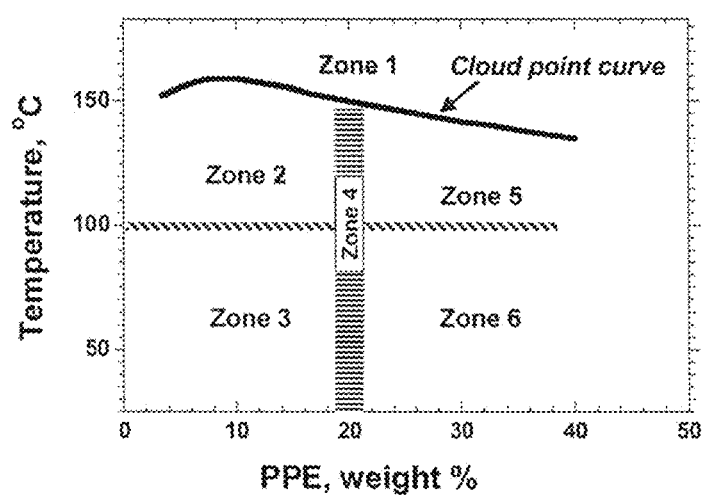
FIG. 1 is a phase diagram for a poly(phenylene ether) and epoxy.
Figure 2:
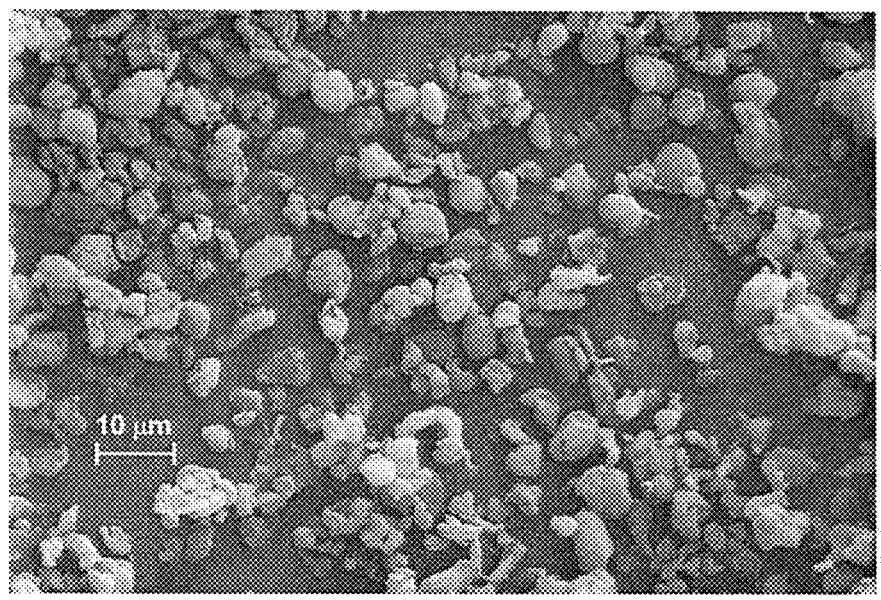
FIG. 2 is a Scanning Electron Micrograph (SEM) of a poly(phenylene ether) sample (PPE-A) with a mean particle size of 6.07 microns.
Figure 3:
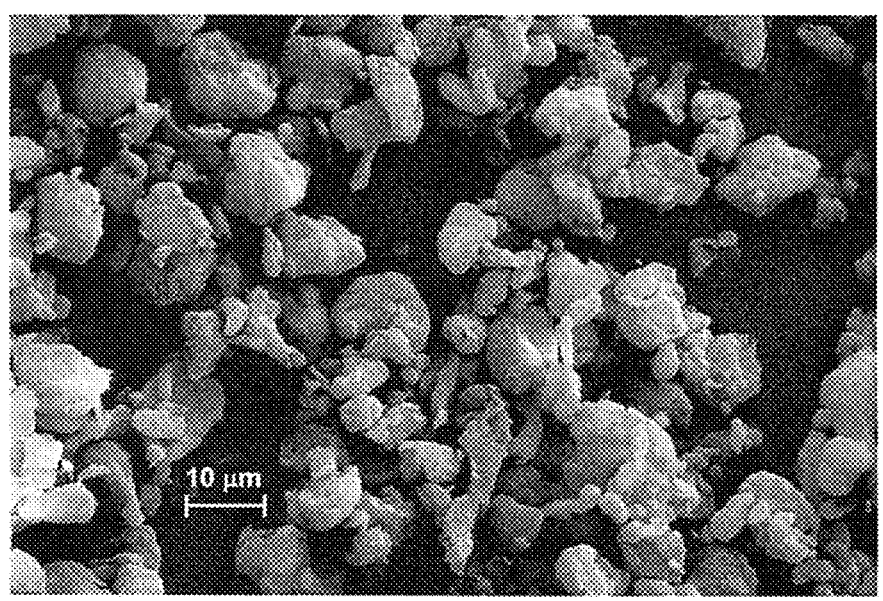
FIG. 3 is a Scanning Electron Micrograph of a poly(phenylene ether) sample (PPE-B) with a mean particle size of 10.9 microns.
Figure 4:
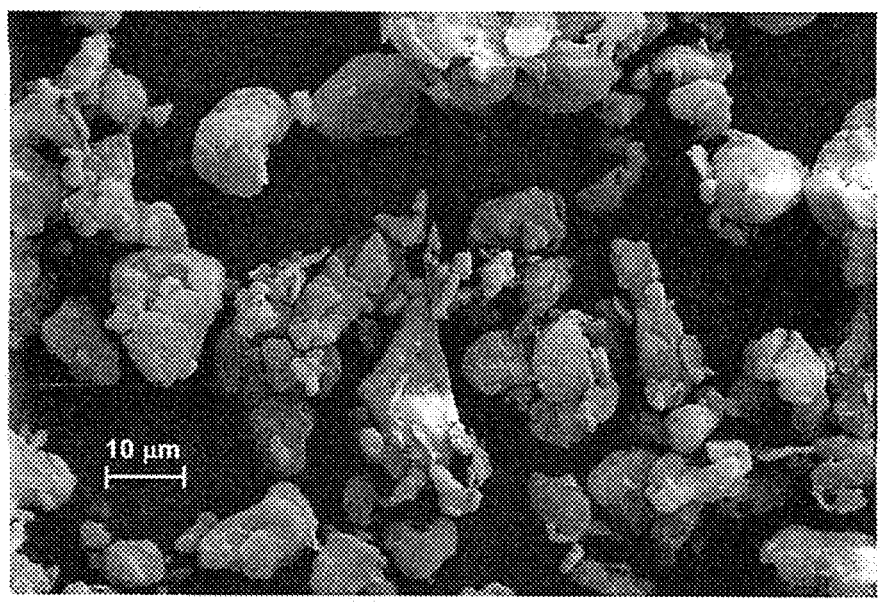
FIG. 4 is a Scanning Electron Micrograph of a poly(phenylene ether) sample (PPE-C) with a mean particle size of 15.7 microns.
Figure 5:
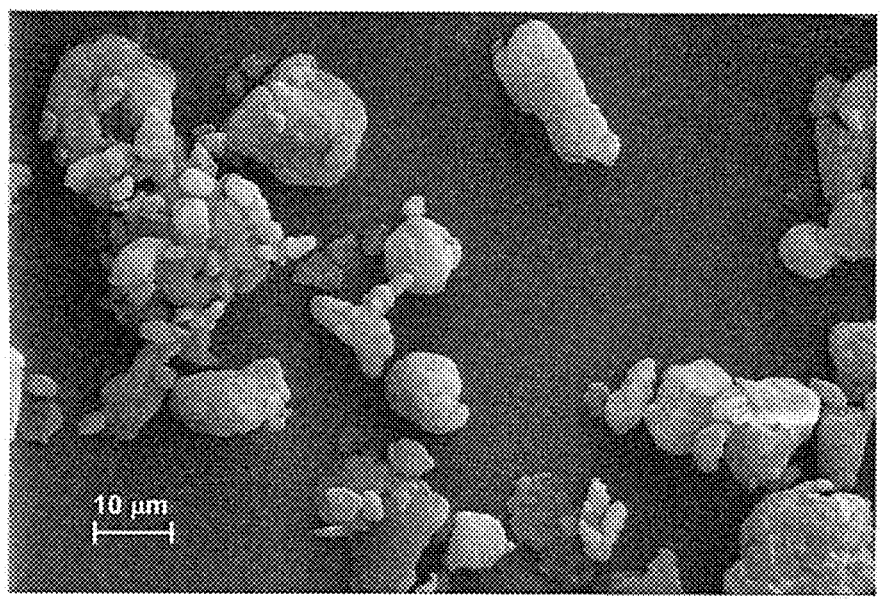
FIG. 5 is a Scanning Electron Micrograph of a poly(phenylene ether) sample (PPE-D) with a mean particle size of 46.7 microns.
Figure 6:
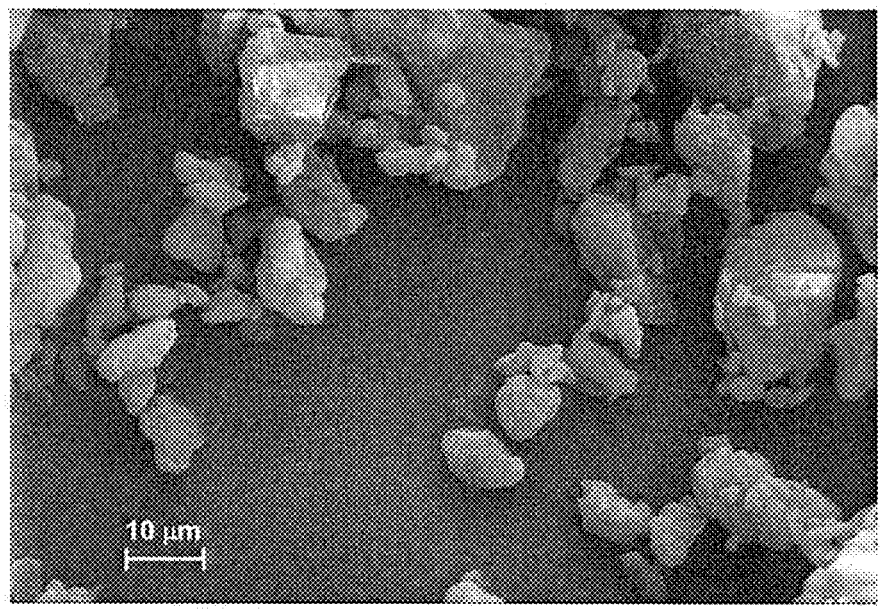
FIG. 6 is a Scanning Electron Micrograph of a poly(phenylene ether) sample (PPE-E) with a mean particle size of 87.8 microns.
Figure 7:
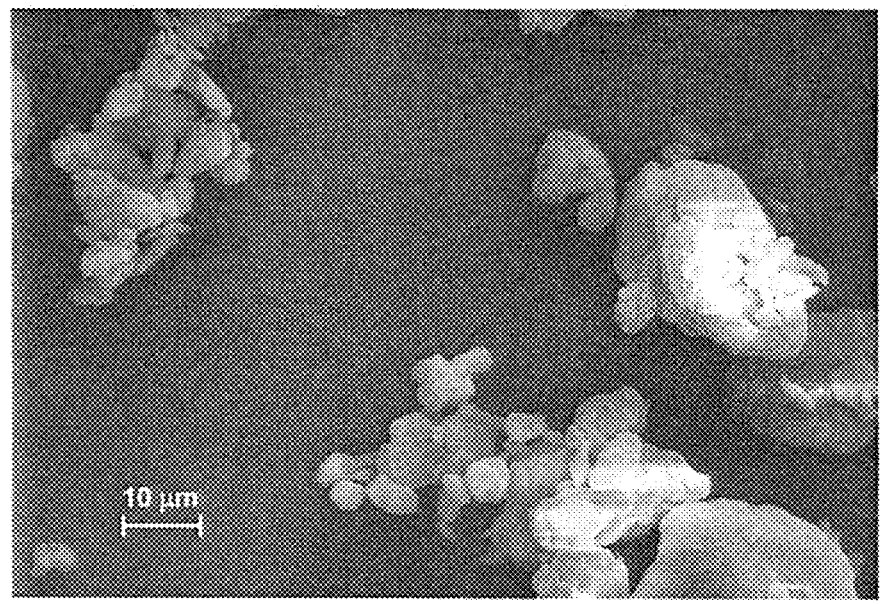
FIG. 7 is a Scanning Electron Micrograph of a poly(phenylene ether) sample (PPE-F) with a mean particle size of 264.1 microns.

All cited patents, patent applications, and other references are incorporated herein by reference in their entirety. However, if a term in the present application contradicts or conflicts with a term in the incorporated reference, the term from the present application takes precedence over the conflicting term from the incorporated reference. All ranges disclosed herein are inclusive of the endpoints, and the endpoints are independently combinable with each other. The use of the terms "a" and "an" and "the" and similar referents in the context of describing the invention (especially in the context of claims) are to be construed to cover both the singular and the plural, unless otherwise indicated herein or clearly contradicted by context. It should further be noted that the terms "first," "second," and the like herein do not denote any order, quantity, or importance, but rather are used to distinguish one element from another. The modifier "about" used in connection with a quantity is inclusive of the stated value and has the meaning dictated by the context (that is, it includes the degree of error associated with measurement of the particular quantity). As used herein weight percentages are based on a 100 weight percent composition.

Components

Poly(Phenylene Ether)

The composition comprises a poly(phenylene ether). In some embodiments, the poly(phenylene ether) used to form the composition comprises repeating structural units of the formula

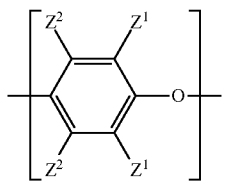

wherein for each structural unit, each $Z^1$ is independently halogen, unsubstituted or substituted $C_1$-$C_{12}$ hydrocarbyl with the proviso that the hydrocarbyl group is not tertiary hydrocarbyl, $C_1$-$C_{12}$ hydrocarbylthio, $C_1$-$C_1$ hydrocarbyloxy, or $C_2$-$C_{12}$ halohydrocarbyloxy wherein at least two carbon atoms separate the halogen and oxygen atoms; and each $Z^2$ is independently hydrogen, halogen, unsubstituted or substituted $C_1$-$C_{12}$ hydrocarbyl with the proviso that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms.

As used herein, the term "hydrocarbyl", whether used by itself, or as a prefix, suffix, or fragment of another term, refers to a residue that contains only carbon and hydrogen. The residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties. However, when the hydrocarbyl residue is described as "substituted", it can contain heteroatoms over and above the carbon and hydrogen members of the substituent residue. Thus, when specifically described as substituted, the hydrocarbyl residue can also contain halogen atoms, nitro groups, cyano groups, carbonyl groups, carboxylic acid groups, ester groups, amino groups, amide groups, sulfonyl groups, sulfoxyl groups, sulfonamide groups, sulfamoyl groups, hydroxyl groups, alkoxyl groups, or the like, and it can contain heteroatoms within the backbone of the hydrocarbyl residue.

The poly(phenylene ether) can comprise molecules having aminoalkyl-containing end group(s), typically located in an ortho position to the hydroxy group. Also frequently present are tetramethyldiphenoquinone (TMDQ) end groups, typically obtained from reaction mixtures in which tetramethyldiphenoquinone by-product is present. In some embodiments the poly(phenylene ether) comprises TMDQ end groups in an amount of less than 5 weight percent, specifically less than 3 weight percent, more specifically less than 1 weight percent, based on the weight of the poly(phenylene ether). In some embodiments, the poly(phenylene ether) comprises, on average, about 0.7 to about 2 moles, specifically about 1 to about 1.5 moles, of chain-terminal hydroxyl groups per mole of poly(phenylene ether).

The poly(phenylene ether) can be in the form of a homopolymer, a copolymer, a graft copolymer, an ionomer, or a block copolymer, as well as combinations comprising at least one of the foregoing. Poly(phenylene ether) includes polyphenylene ether comprising 2,6-dimethyl-1,4-phenylene ether units optionally in combination with 2,3,6-trimethyl-1,4-phenylene ether units. In some embodiments, the poly(phenylene ether) is an unfunctionalized poly(phenylene ether). An unfunctionalized poly(phenylene ether) is a poly(phenylene ether) consisting of the polymerization product of one or more phenols. The term "unfunctionalized poly(phenylene ether)" excludes functionalized poly(phenylene ether)s such as acid-functionalized poly(phenylene ether)s and anhydride-functionalized poly(phenylene ether)s. In some embodiments, the poly(phenylene ether) comprises a poly(2,6-dimethyl-1,4-phenylene ether).

The poly(phenylene ether) can be prepared by the oxidative coupling of monohydroxyaromatic compound(s) such as 2,6-xylenol and/or 2,3,6-trimethylphenol. Catalyst systems are generally employed for such coupling. They can contain heavy metal compounds such as copper, manganese, or cobalt compounds, usually in combination with one or more ligands such as a primary amine, a secondary amine, a tertiary amine, a halide, or a combination of two or more of the foregoing.

In some embodiments, the composition comprises less than or equal to 2 weight percent, specifically less than or equal to 1 weight percent, more specifically less than or equal to 0.5 weight percent, of a poly(phenylene ether)-polysiloxane block copolymer. In some embodiments, the composition excludes poly(phenylene ether)-polysiloxane block copolymer. Poly(phenylene ether)-polysiloxane block copolymers, which comprise at least one poly(phenylene ether) block and at least one polysiloxane block, are described, for example, in U.S. Patent Application Publication No. US 2010/0139944 A1 (Guo et al.).

In some embodiments, the poly(phenylene ether) is characterized by a weight average molecular weight and a peak molecular weight, wherein a ratio of the weight average molecular weight to the peak molecular weight is about 1.3:1 to about 4:1. Within this range, the ratio can be about 1.5:1 to about 3:1, specifically about 1.5:1 to about 2.5:1, more specifically about 1.6:1 to about 2.3:1, still more specifically 1.7:1 to about 2.1:1. As used herein, the term "peak molecular weight" is defined as the most commonly occurring molecular weight in the molecular weight distribution. In statistical terms, the peak molecular weight is the mode of the molecular weight distribution. In practical terms, when the molecular weight is determined by a chromatographic method such as gel permeation chromatography, the peak molecular weight is the poly(phenylene ether) molecular weight of the highest point in a plot of molecular weight on the x-axis versus absorbance on the y-axis.

In some embodiments, the poly(phenylene ether) is essentially free of incorporated diphenoquinone residues. "Diphenoquinone residues" means the dimerized moiety that may form in the oxidative polymerization reaction giving rise to the poly(arylene ethers) contemplated for use in the present invention. As described in U.S. Pat. No. 3,306,874 (Hay), synthesis of poly(arylene ethers) by oxidative polymerization of monohydric phenols yields not only the desired poly(phenylene ether) but also a diphenoquinone side product. For example, when the monohydric phenol is 2,6-dimethylphenol, 3,3',5,5'-tetramethyldiphenoquinone (TMDQ) is generated. Typically, the diphenoquinone is "re-equilibrated" into the poly(phenylene ether) (i.e., the diphenoquinone is incorporated into the poly(phenylene ether) structure) by heating the polymerization reaction mixture to yield a poly(phenylene ether) comprising terminal or internal diphenoquinone residues. As used herein, "essentially free" means that fewer than 1 weight percent of poly(phenylene ether) molecules comprise the residue of a diphenoquinone as measured by nuclear magnetic resonance spectroscopy (NMR) (Mole of TMDQ×Molecular Weight of unit TMDQ)/(Mole of Polymer×Number Average Molecular Weight (Mn)). In some embodiments, fewer than 0.5 weight percent of poly(phenylene ether) molecules comprise the residue of a diphenoquinone.

For example, as shown in Scheme 1, when a poly(phenylene ether) is prepared by oxidative polymerization of 2,6-dimethylphenol to yield poly(2,6-dimethyl-1,4-phenylene ether) and 3,3',5,5'-tetramethyldiphenoquinone, reequilibration of the reaction mixture can produce a poly (phenylene ether) with terminal and internal residues of incorporated diphenoquinone.

Scheme 1

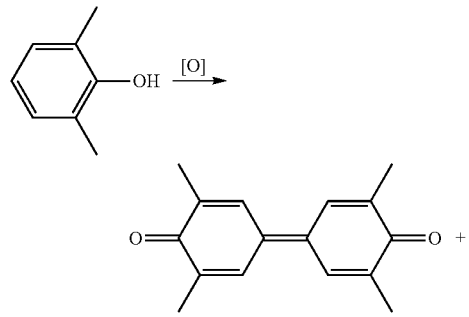

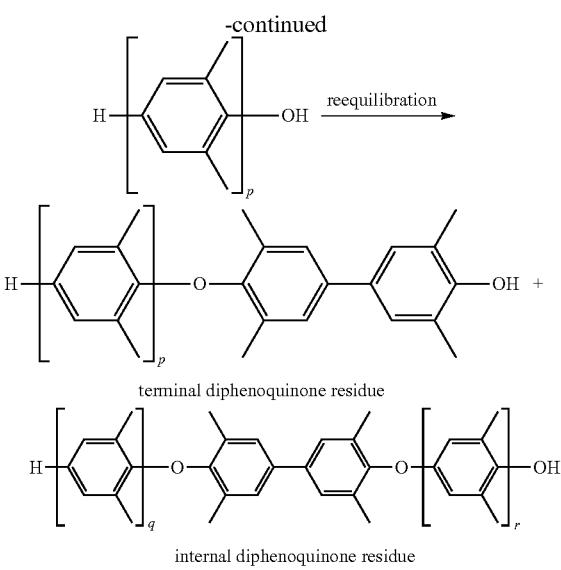

terminal diphenoquinone residue internal diphenoquinone residue

However, such re-equilibration reduces the molecular weight of the poly(phenylene ether) (e.g., p and q+r are less than n). Accordingly, when a higher molecular weight and stable molecular weight poly(phenylene ether) is desired, it may be desirable to separate the diphenoquinone from the poly(phenylene ether) rather than re-equilibrating the diphenoquinone into the poly(phenylene ether) chains. Such a separation can be achieved, for example, by precipitation of the poly(phenylene ether) in a solvent or solvent mixture in which the poly(phenylene ether) is insoluble and the diphenoquinone is soluble with very minimum time between end of reaction and precipitation.

For example, when a poly(phenylene ether) is prepared by oxidative polymerization of 2,6-dimethylphenol in toluene to yield a toluene solution comprising poly(2,6-dimethyl-1, 4-phenylene ether) and 3,3',5,5'-tetramethyldiphenoquinone, a poly(2,6-dimethyl-1,4-phenylene ether) essentially free of diphenoquinone can be obtained by mixing 1 volume of the toluene solution with about 1 to about 4 volumes of methanol or methanol water mixture. Alternatively, the amount of diphenoquinone side-product generated during oxidative polymerization can be minimized (e.g., by initiating oxidative polymerization in the presence of less than 10 weight percent of the monohydric phenol and adding at least 95 weight percent of the monohydric phenol over the course of at least 50 minutes), and/or the re-equilibration of the diphenoquinone into the poly(phenylene ether) chain can be minimized (e.g., by isolating the poly(phenylene ether) no more than 200 minutes after termination of oxidative polymerization). These approaches are described in International patent application Ser. No. 12/255,694, published as United States Published Application 2009/0211967 (Delsman et. al.). Alternatively, diphenoquinone amounts can be achieved by removing the TMDQ formed during polymerization by filtration, specifically after stopping the oxygen feed into the polymerization reactor. In some embodiments, the poly(phenylene ether) comprises 2,6-dimethyl-1,4-phenylene ether units, 2,3,6-trimethyl-1,4-phenylene ether units, or a combination thereof. In some embodiments, the poly(phenylene ether) is a poly(2,6-dimethyl-1,4-phenylene ether).

The poly(phenylene ether) can comprise molecules having aminoalkyl-containing end group(s), typically located in a position ortho to the hydroxy group. Also frequently present are tetramethyldiphenoquinone (TMDQ) end groups, typically obtained from 2,6-dimethyl phenol-containing reaction mixtures in which tetramethyldiphenoquinone by-product is present. The poly(phenylene ether) can be in the form of a homopolymer, a copolymer, a graft copolymer, an ionomer, or a block copolymer, as well as combinations comprising at least one of the foregoing.

The poly(phenylene ether) is typically prepared by the oxidative coupling of at least one monohydroxyaromatic compound such as 2,6-xylenol or 2,3,6-trimethylphenol. Catalyst systems are generally employed for such coupling; they typically contain at least one heavy metal compound such as a copper, manganese or cobalt compound, usually in combination with various other materials.

In one embodiment, the poly(phenylene ether) is poly(2, 6-dimethyl-1,4-phenylene ether), CAS Reg. No. 24938-67-8, having an intrinsic viscosity of 0.3 to 1.5 deciliter per gram. In a further embodiment, the poly(phenylene ether) is poly(2,6-dimethyl-1,4-phenylene ether) having an intrinsic viscosity of 0.46 deciliters per gram, measured in chloroform at 25° C. In another embodiment, the poly(phenylene ether) is poly(2,6-dimethyl-1,4-phenylene ether) having an intrinsic viscosity of 0.40 deciliters per gram, measured in chloroform at 25° C.

In one embodiment of the composition of the invention, 5 to 40 percent by weight of the poly(phenylene ether) is used. In another embodiment, 10 to 35 percent by weight of the poly(phenylene ether) is used. In another embodiment, 15 to 30 percent by weight of the poly(phenylene ether) is used. When the poly(phenylene ether) is a poly(2,6-dimethyl-1,4-phenylene ether), the intrinsic viscosity range of about 0.3 to about 0.6 deciliter per gram can correspond to a number average molecular weight range of about 16,000 to about 25,000 atomic mass units.

Poly(Phenylene Ether)-Polysiloxane Copolymer

In one embodiment, the composition comprises a mixture of a poly(phenylene ether) homopolymer and a poly(phenylene ether) polysiloxane copolymer. The poly(phenylene ether)-polysiloxane copolymer can be a block copolymer. The poly(phenylene ether) polysiloxane block copolymer comprises a poly(phenylene ether) block and a polysiloxane block such as described in U.S. Pat. No. 8,017,697.

The block copolymer comprising a poly(phenylene ether) block and a polysiloxane block comprises, on average, 35 to 80 siloxane repeating units, 1 to 8 weight percent siloxane repeating units and 12 to 99 weight percent arylene ether repeating units. The mixture is the product of a process comprising oxidatively copolymerizing a monomer mixture comprising a monohydric phenol and a hydroxyaryl-terminated polysiloxane. The block copolymer typically has a weight average molecular weight of at least 30,000 atomic mass units.

The poly(phenylene ether) homopolymer that is part of the mixture is the product of polymerizing a monohydric phenol alone and is a by-product of the block copolymer synthesis. When the monohydric phenol consists of a single compound (for example, 2,6-dimethylphenol, although other substituted monhydric phenols may also be used), the poly(phenylene ether) is the product of homopolymerizing that single monohydric phenol. When the monohydric phenol comprises two or more distinct monohydric phenol species (for example, a mixture of 2,6-dimethylphenol and 2,3,6-trimethylphenol), the poly(phenylene ether) is the product of copolymerizing the two or more distinct monohydric phenol species. Using nuclear magnetic resonance methods, it has not been possible to allocate the phenylene ether residues between poly(phenylene ether) and poly(phenylene ether)-polysiloxane block copolymer. However, the presence of poly(phenylene ether) is inferred from the presence of "tail" groups as defined below (e.g., 2,6-dimethylphenoxy groups when the monohydric phenol is 2,6-dimethylphenol) and/or the presence of "biphenyl" groups as defined below (e.g., the residue of 3,3',5,5'-tetramethyl-4,4'-biphenol) in the isolated product.

In addition to the poly(phenylene ether) homopolymer, the mixture comprises a poly(phenylene ether)-polysiloxane block copolymer. The poly(phenylene ether)-polysiloxane block copolymer comprises a poly(phenylene ether) block and a polysiloxane block. The poly(phenylene ether) block is a residue of the polymerization of the monohydric phenol. In some embodiments, the poly(phenylene ether) block comprises arylene ether repeating units having the structure:

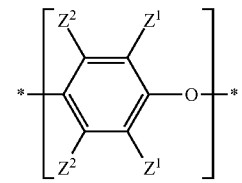

wherein for each repeating unit, each $Z^1$ is independently halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_1$-$C_{12}$ halohydrocarbyloxy wherein at least two carbon atoms separate the halogen and oxygen atoms; and each $Z_2$ is independently hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, hydrocarbyloxy, or $C_1$-$C_{12}$ halohydrocarbyloxy wherein at least two carbon atoms separate the halogen and oxygen atom.

In some embodiments, the poly(phenylene ether) block comprises 2,6-dimethyl-1,4-phenylene ether repeating units, that is, repeating units having the structure:

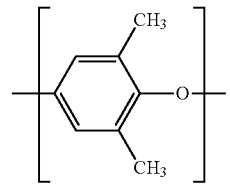

or 2,3,6-trimethyl-1,4-phenylene ether repeating units, or a combination thereof.

The polysiloxane block is a residue of the hydroxyaryl-terminated polysiloxane. In some embodiments, the polysiloxane block comprises repeating units having the structure:

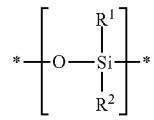

wherein each occurrence of $R^1$ and $R^2$ is independently hydrogen, $C_1$-$C_{12}$ hydrocarbyl or $C_1$-$C_{12}$ halohydrocarbyl; and the polysiloxane block further comprises a terminal unit having the structure:

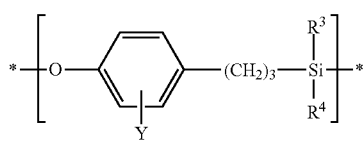

wherein Y is hydrogen, $C_1$-$C_{12}$ hydrocarbyl, $C_1$-$C_{12}$ hydrocarbyloxy, or halogen, and wherein each occurrence of $R^3$ and $R^4$ is independently hydrogen, $C_1$-$C_{12}$ hydrocarbyl or $C_1$-$C_{12}$ halohydrocarbyl. In some embodiments, $R^3$ and $R^4$ are $C_1$-$C_6$ alkyl, specifically $C_1$-$C_3$ alkyl, more specifically methyl. In some embodiments, the polysiloxane repeating units comprise dimethylsiloxane (—Si(CH$_3$)$_2$O—) units. In some embodiments, the polysiloxane block has the structure:

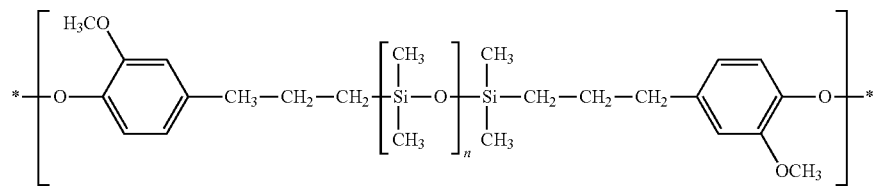

wherein n is 35 to 60.

The hydroxyaryl-terminated polysiloxane comprises at least one hydroxyaryl terminal group. In some embodiments, the hydroxyaryl-terminated polysiloxane has a single hydroxyaryl terminal group, in which case a poly(phenylene ether)-polysiloxane diblock copolymer is formed. In other embodiments, the hydroxyaryl-terminated polysiloxane has two hydroxyaryl terminal groups, in which case poly(phenylene ether)-polysiloxane diblock and/or triblock copolymers are formed. It is also possible for the hydroxyaryl-terminated polysiloxane to have a branched structure that allows three or more hydroxyaryl terminal groups and the formation of corresponding branched copolymers.

As noted above, the polysiloxane block comprises, on average, 35 to 80 siloxane repeating units. Within this range, the number of siloxane repeating units can be 35 to 60, more specifically 40 to 50. The number of siloxane repeating units in the polysiloxane block is essentially unaffected by the copolymerization and isolation conditions, and it is therefore equivalent to the number of siloxane repeating units in the hydroxyaryl-terminated polysiloxane starting material. When not otherwise known, the average number of siloxane repeating units per hydroxylaryl-terminate polysiloxane molecule can be determined by NMR methods that compare the intensity of signals associated with the siloxane repeating units to those associated with the hydroxyaryl terminal groups. For example, when the hydroxyaryl-terminated polysiloxane is a eugenol-capped polydimethylsiloxane, it is possible to determine the average number of siloxane repeating units by a proton nuclear magnetic resonance ($^1$H NMR) method in which integrals for the protons of the dimethylsiloxane resonance and the protons of the eugenol methoxy group are compared.

The mixture of a poly(phenylene ether) homopolymer and a poly(phenylene ether) polysiloxane block copolymer comprises 1 to 8 weight percent siloxane repeating units and 12 to 99 weight percent arylene ether repeating units, based on the total weight of the thermoplastic composition. Within these ranges, the weight percent of siloxane repeating units can be 2 to 7 weight percent, specifically 3 to 6 weight percent, more specifically 4 to 5 weight percent; and the weight percent arylene ether repeating units can be 50 to 98 weight percent, specifically 70 to 97 weight percent, more specifically 90 to 96 weight percent.

As mentioned above, the mixture of a poly(phenylene ether) homopolymer and a poly(phenylene ether) polysiloxane block copolymer is the product of a process comprising oxidatively copolymerizing a monomer mixture comprising a monohydric phenol and a hydroxyaryl-terminated polysiloxane. As such, the process is simpler than poly(phenylene ether)-polysiloxane block copolymer synthesis methods that require the coupling of pre-formed poly(phenylene ether) and polysiloxane blocks.

The mixture as described herein comprising the poly(phenylene ether) homopolymer and a poly(phenylene ether) polysiloxane block copolymer has a weight average molecular weight of at least 30,000 atomic mass units. In some embodiments the weight average molecular weight is 30,000 to 150,000 atomic mass units, specifically 35,000 to 120,000 atomic mass units, more specifically 40,000 to 90,000 atomic mass units, even more specifically 45,000 to 70,000 atomic mass units. In some embodiments, the number average molecular weight is 10,000 to 50,000 atomic mass units, specifically 10,000 to 30,000 atomic mass units, more specifically 14,000 to 24,000 atomic mass units. Chromatographic methods are available for determining molecular weight.

The mixture can also include relatively small amounts of very low molecular weight species. Thus, in some embodiments, the mixture comprises less than 25 weight percent of molecules having a molecular weight less than 10,000 atomic mass units, specifically 5 to 25 weight percent of molecules having a molecular weight less than 10,000 atomic mass units, more specifically 7 to 21 weight percent of molecules having a molecular weight less than 10,000 atomic mass units. In some embodiments, the molecules having a molecular weight less than 10,000 atomic mass units comprise, on average, 5 to 10 weight percent siloxane repeating units, specifically 6 to 9 weight percent siloxane repeating units.

Similarly, the mixture can also include relatively small amounts of very high molecular weight species. Thus, in some embodiments, mixture comprises less than 25 weight percent of molecules having a molecular weight greater than 100,000 atomic mass units, specifically 5 to 25 weight percent of molecules having a molecular weight greater than 100,000 atomic mass units, more specifically 7 to 23 weight percent of molecules having a molecular weight greater than 100,000 atomic mass units. In some embodiments, the molecules having a molecular weight greater than 100,000 atomic mass units comprise, on average, 3 to 6 weight percent siloxane repeating units, specifically 4 to 5 weight percent siloxane repeating units.

In some embodiments, the mixture of a poly(phenylene ether) homopolymer and a poly(phenylene ether) polysiloxane block copolymer has an intrinsic viscosity of at least 0.3 deciliter per gram, as measured at 25° C. in chloroform. The intrinsic viscosity can be 0.3 to 0.6 deciliter per gram, specifically 0.3 to 0.5 deciliter per gram, still more specifically 0.31 to 0.55 deciliter per gram, yet more specifically 0.35 to 0.47 deciliter per gram, and yet more specifically 0.385 to 0.425 deciliter per gram.

One indication of the efficiency with which the hydroxyaryl-terminated polysiloxane is incorporated into block copolymer is the low concentration of so-called poly(phenylene ether) "tail" groups. In a homopolymerization of 2,6-dimethylphenol, a large fraction of product molecules have a so-called head-to-tail structure in which the linear product molecule is terminated on one end by a 3,5-dimethyl-4-hydroxyphenyl "head" and on the other end by a 2,6-dimethylphenoxy "tail". Thus, when the monohydric phenol consists of 2,6-dimethylphenol, the poly(phenylene ether) tail group has the structure:

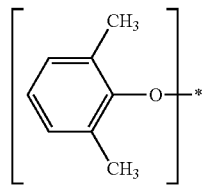

wherein the 3-, 4-, and 5-positions of the ring are substituted with hydrogen atoms. (that is, the term 2,6-dimethylphenoxy does not encompass divalent 2,6-dimethyl-1,4-phenylene ether groups). In a copolymerization of monohydric phenol with hydroxyaryl-terminated polysiloxane, incorporation of the hydroxyaryl-terminated polysiloxane into block copolymer will reduce the concentration of arylene ether "tail" groups. Thus, in some embodiments, the monohydric phenol consists of 2,6-dimethylphenol, and the thermoplastic composition of comprises less than or equal to 0.4 weight percent, specifically 0.2 to 0.4 weight percent, of 2,6-dimethylphenoxy groups, based on the weight of the thermoplastic composition.

The mixture containing the poly(phenylene ether)-polysiloxane block copolymer can further include groups derived from a diphenoquinone, which is itself an oxidation product of the monohydric phenol. For example, when the monohydric phenol is 2,6-dimethylphenol, the poly(phenylene ether)-polysiloxane can comprise 1.1 to 2.0 weight percent of 2,6-dimethyl-4-(3,5-dimethyl-4-hydroxyphenyl)phenoxy groups.

The mixture can be isolated from solution by an isolation procedure that minimizes volatile and nonvolatile contaminants. For example, in some embodiments, the poly(phenylene ether)-polysiloxane copolymer comprises less than or equal to 1 weight percent of total volatiles, specifically 0.2 to 1 weight percent of total volatiles, determined according to the procedure in the working examples below. In some embodiments, the monomer mixture is oxidatively copolymerized in the presence of a catalyst comprising a metal (such as copper or manganese), and the poly(phenylene ether)-polysiloxane copolymer comprises less than or equal to 100 parts per million by weight of the metal, specifically 5 to 100 parts per million by weight of the metal, more specifically 10 to 50 parts per million by weight of the metal, even more specifically 20 to 50 parts by weight of the metal.

The mixture containing the poly(phenylene ether)-polysiloxane can be prepared by a method comprising oxidatively copolymerizing a monohydric phenol and a hydroxyaryl-terminated polysiloxane to form a poly(phenylene ether)-polysiloxane; wherein the oxidative copolymerization is conducted with a reaction time greater than or equal to 80 minutes; wherein the hydroxyaryl-terminated polysiloxane comprises, on average, 35 to 80 siloxane repeating units and the hydroxyaryl-terminated polysiloxane constitutes 1 to 8 weight percent of the combined weight of the monohydric phenol and the hydroxyaryl-terminated polysiloxane.

In other embodiments, the hydroxyaryl-terminated polysiloxane comprises, on average, 35 to 80 siloxane repeating units; and wherein the hydroxyaryl-terminated polysiloxane constitutes more than 20 and up to 80 weight percent of the combined weight of the monohydric phenol and the hydroxyaryl-terminated polysiloxane.

In some embodiments, the hydroxyaryl-terminated polysiloxane comprises, on average, 40 to 70 siloxane repeating units, specifically 40 to 60 siloxane repeating units, more specifically 40 to 50 siloxane repeating units.

As noted above, in one embodiment, the hydroxyaryl-terminated polysiloxane constitutes 1 to 8 weight percent, 9 to 20 percent, and more than 20 and up to 80 percent of the combined weight of the monohydric phenol and the hydroxyaryl-terminated polysiloxane. Within this range, the hydroxyaryl-terminated polysiloxane can constitute 2 to 7 weight percent, specifically 3 to 6 weight percent, more specifically 4 to 6 weight percent of the combined weight of the monohydric phenol and the hydroxyaryl-terminated polysiloxane.

In some embodiments, the oxidative copolymerization is initiated in the presence of at least 80 weight percent of the hydroxyaryl-terminated polysiloxane, specifically at least 90 weight percent of the hydroxyaryl-terminated polysiloxane, more specifically 100 weight percent of the hydroxyaryl-terminated polysiloxane.

In some embodiments, the oxidative copolymerization is initiated in the presence of 0 to 50 weight percent of the monohydric phenol, specifically 1 to 30 weight percent of the monohydric phenol, more specifically 2 to 20 weight percent of the monohydric phenol, even more specifically 5 to 10 weight percent of the monohydric phenol.

The oxidative copolymerization is conducted with a reaction time greater than or equal between about 80 and 100 minutes. The reaction time is the elapsed time between initiation and termination of oxygen flow. For brevity, the description herein repeatedly refers to "oxygen" or "oxygen flow", it will be understood that any oxygen containing gas, including air, can be used as the oxygen source.) In some embodiments, the reaction time is 110 to 300 minutes, specifically 140 to 250 minutes, more specifically 170 to 220 minutes.

The oxidative copolymerization can include a "build time" which is the time between completion of monomer addition and termination of oxygen flow. In some embodiments, the reaction time comprises a build time of 80 to 160 minutes. In some embodiments, the reaction temperature during at least part of the build time can be 40 to 60° C., specifically 45 to 55° C.

After termination of the copolymerization reaction, the mixture can be isolated from solution using methods known in the art for isolating poly(phenylene ether)s from solution. For example, the poly(phenylene ether)-polysiloxane copolymer can be isolated by precipitation with an antisolvent, such as a $C_1$-$C_6$ alkanol, including methanol, ethanol, n-propanol, and isopropanol. The present inventors have observed that the use of isopropanol is advantageous because it is a good solvent for unreacted hydroxyaryl-terminated polysiloxane. Therefore, precipitation and washing with isopropanol substantially removes hydroxyaryl-terminated polysiloxane from the isolated product. As an alternative to precipitation, the poly(phenylene ether)-polysiloxane copolymer can be isolated by direct isolation methods, including devolatilizing extrusion.

In some embodiments, the poly(phenylene ether)-polysiloxane comprises 1 to 8 weight percent siloxane repeating units.

In some embodiments, the poly(phenylene ether)-polysiloxane copolymer has a weight average molecular weight of at least 30,000 atomic mass units, specifically 30,000 to 150,000 atomic mass units, more specifically 35,000 to 120,000 atomic mass units, even more specifically 40,000 to 90,000 atomic mass units, yet more specifically 45,000 to 70,000 atomic mass units.

In a very specific embodiment, the poly(phenylene ether)-polysiloxane copolymer has an intrinsic viscosity of about 0.385-0.425 dL/g and a weight percent of incorporated siloxane of at least about 4-6 percent. In another embodiment, the poly(phenylene ether)-polysiloxane copolymer has an intrinsic viscosity of about 0.41 dL/g. In another very specific embodiment, the poly(phenylene ether)-polysiloxane copolymer is described as Example 16 in U.S. Pat. No. 8,017,697. Thus, in one embodiment, the poly(phenylene ether)-polysiloxane copolymer has an intrinsic viscosity of about 0.39 dL/g and a weight percent of incorporated siloxane of at least about 4.78 percent.

In some embodiments, the composition of the present invention contains about 5 to about 55 weight percent, and more specifically about 10 to about 40 weight percent of the poly(phenylene ether)-polysiloxane copolymer. More specifically, the composition of the present invention contains about 10 to about 25 weight percent and more specifically about 15 to about 25 weight percent of the poly(phenylene ether)-polysiloxane copolymer.

In other embodiments, the composition comprises a polysulfone (polyaryl ether sulfones)—they are used in epoxy resin. Polyarylsulfones are a class of high use-temperature thermoplastics that characteristically exhibit excellent thermal-oxidative resistance, good solvent resistance, hydrolytic stability, and creep resistance. [Harris, J. E. "Handbook of Plastic Materials and Technology", Rubin, I. I., Ed.; Wiley-Interscience: NY, 1990; p. 487. Johnson, R. N.: Farnham, A. G.: Clendinning, R. A.: Hale, W. F.: Merriam, C. N. *J. Polym. Sci., Part A*-1, 1967, 5, 2375] Polysulfone is prepared by the nucleophilic displacement of the chlorides on bis (p-chlorophenyl) sulfone by the anhydrous di sodium salt of bisphenol A as depicted n Scheme 2. The reaction is conducted in a dipolar aprotic solvent which is reported to be dimethyl sulfoxide. This polysulfone is available in under the Udel trademark.

Scheme 2

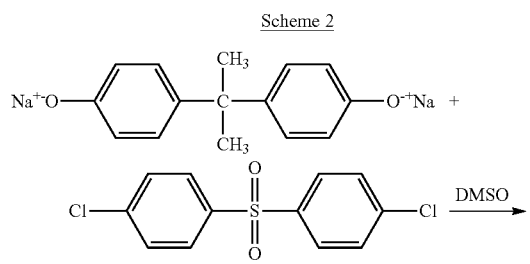

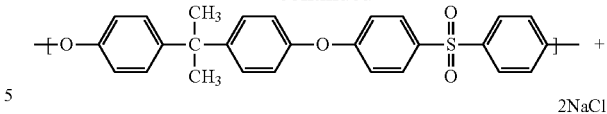

2NaCl

Another polysulfone prepared from biphenol and bis(p-chlorophenyl) sulfone resin is available under the Radel R polyphenylsulfone (PPSU) trade name. In addition, polyethersulfone (PES). In 1992 ICI withdrew from the business. PES offers high heat ($T_g$ of 225° C.) and thermal stability, better chemical/solvent resistance, and improved toughness over PSF. PES is available under the Radel A trade name from Solvay Advanced Polymers.

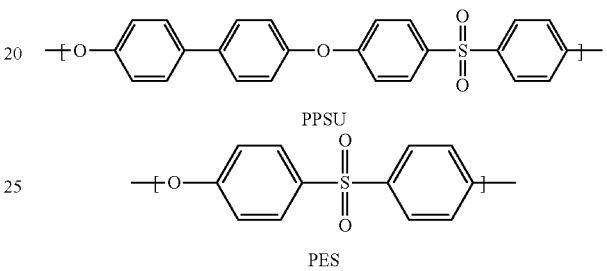

PPSU

PES

Poly(Phenylene Ether) Particle Size

Very small, "ultra-fine" particles of PPE are used in the present invention. In one embodiment, the ultra-fine PPE particles have a mean particle size of 6.07 microns and a standard deviation of 2.3 microns. In another embodiment, the ultra-fine PPE particles have a mean particle size of 10.9 microns and a standard deviation of 4.7 microns. In yet another embodiment, the ultra-fine PPE particles have a mean particle size of 15.7 microns and a standard deviation of 5.9 microns.

Thus in aspect, the invention is directed to ultrafine particles of poly(phenylene ether) such that the mean particle size (volume distribution) is less than 40 microns as determined by particle size distribution analysis.

In one embodiment of this aspect, the invention is directed to ultrafine particles of poly(phenylene ether) wherein the poly(phenylene ether) is poly(2,6-dimethyl-1,4-phenylene ether) having an intrinsic viscosity of 0.40 deciliters per gram, measured in chloroform at 25° C.

In another embodiment, ultrafine particles of poly(phenylene ether) of claim 1, wherein the poly(phenylene ether) is poly(2,6-dimethyl-1,4-phenylene ether) having an intrinsic viscosity of 0.46 deciliters per gram, measured in chloroform at 25° C.

In another embodiment, the invention is directed to ultrafine particles of poly(arylene ether, wherein the poly(phenylene ether) is poly(2,6-dimethyl-1,4-phenylene ether) having an intrinsic viscosity of 0.30 deciliters per gram, measured in chloroform at 25° C.

In another embodiment, the invention is directed to ultrafine particles of poly(arylene ether, wherein the ultrafine particulate poly(phenylene ether) has a diameter of 10 to 40 microns.

In another embodiment, the invention is directed to ultrafine particles of poly(arylene ether, wherein the ultrafine particulate poly(phenylene ether) has a diameter of 12 to 38 microns.

In another embodiment, the invention is directed to ultrafine particles of poly(arylene ether, wherein the ultrafine particulate poly(phenylene ether) has a mean particle size of 6 microns.

In another embodiment, the invention is directed to ultrafine particles of poly(arylene ether, wherein the ultrafine particulate poly(phenylene ether) has a mean particle size of 10 microns.

In another embodiment, the invention is directed to ultrafine particles of poly(arylene ether, wherein the ultrafine particulate poly(phenylene ether) has a mean particle size of 15 microns.

In another embodiment, the invention is directed to ultrafine particles of poly(arylene ether, wherein 90 percent of the particle volume distribution of the ultrafine particulate poly (phenylene ether) is below 8 microns.

In another embodiment, the invention is directed to ultrafine particles of poly(arylene ether, wherein 90 percent of the particle volume distribution of the ultrafine particulate poly (phenylene ether) is below 17 microns.

In another embodiment, the invention is directed to ultrafine particles of poly(arylene ether, wherein 90 percent of the particle volume distribution of the ultrafine particulate poly (phenylene ether) is below 23 microns.

In another embodiment, the invention is directed to ultrafine particles of poly(arylene ether, wherein 50 percent of the particle volume distribution of the ultrafine particulate poly (phenylene ether) is below 6 microns.

In another embodiment, the invention is directed to ultrafine particles of poly(arylene ether, wherein 50 percent of the particle volume distribution of the ultrafine particulate poly (phenylene ether) is below 10 microns.

In another embodiment, the invention is directed to ultrafine particles of poly(arylene ether, wherein 50 percent of the particle volume distribution of the ultrafine particulate poly (phenylene ether) is below 15 microns.

In another embodiment, the invention is directed to ultrafine particles of poly(arylene ether, wherein 10 percent of the particle volume distribution of the ultrafine particulate poly (phenylene ether) is below 4 microns.

In another embodiment, the invention is directed to ultrafine particles of poly(phenylene ether), wherein 10 percent of the particle volume distribution of the ultrafine particulate poly(phenylene ether) is below 6 microns In another embodiment, the invention is directed to ultrafine particles of poly(arylene ether, wherein 10 percent of the particle volume distribution of the ultrafine particulate poly (phenylene ether) is below 9 microns Ultrafine PPE particles can be obtained according to methods readily available to the skilled artisan. For example, the ultrafine particulate PPE can be obtained by jet milling, ball milling, pulverizing, air milling, or grinding commercial PPE. A classifier is often used together with mills for the continuous extraction of rather fine particles from the material being milled. Where "classification" is the sorting of the initial distribution of particles to achieve a desired degree of uniformity. The classification system can be a screen of certain mesh size on the walls of the grinding chamber. Once the milled particles reach sizes to pass through the screen they are removed. Larger particles remain in the chamber for additional milling and size reduction.

Air classification is another method of removing the finer particles from milling. Air classifiers include static classifiers (cyclones), dynamic classifiers (single stage, multi-stage), cross-flow classifiers, counter-flow classifiers (elutriators). In general, air classifiers to convey the particle from the mill to the classifying operation where the fine particles are carried out with the air to a collector. The course particles being too heavy to be carried out are returned to the mill for further milling and size reduction. In larger operations air classification would be preferred (more efficient). In smaller operations a screen would be used.

In one embodiment, the ultrafine particulate PPE can be obtained by jet milling commercial PPE. The resulting particles have the designation PPE-A, PPE-B, and PPE-C. PPE-A, PPE-B, and PPE-C, were milled and removed from the milling chamber by passing through a screen with 6, 14, and 20 micron holes, respectively. In the jet milling technique employed to prepare ultrafine PPE particles, compressed nitrogen gas was introduced into the specially designed nozzles to create supersonic grinding stream. Solid particles of commercial PPE were injected into this violent, turbulent, rotating stream. Rotation generated high speed particle collisions create increasingly smaller particles via particle-on-particle impact collisions. Large particles were held in the grinding area by centrifugal force while centripetal force was used to drive finer particles towards the center of the discharge. A sieve of a desired upper size limit was then used to recover particles with precise size lower than the sieve nominal opening. Larger, particles are recycled to the reduction size chamber for further grinding.

In addition, the ultrafine particulate PPE can be obtained by sieving commercial PPE, for instance, by using appropriately sized sieve pans. Appropriately sized sieve pans include, for instance, U.S. Standard No. 200 (metric size 75 microns), No. 100 (150 microns), and No. 60 (250 microns). These particles will have the designation PPE-D, PPE-E, and PPE-F, respectively.

A description of the ultrafine PPE particles is provided in Table 2. Particle size and shape distribution was determined using the Camsizer® XT from Retsch Technology GmbH operating in air dispersion mode.

TABLE 2

Properties of ultrafine PPE particles

| Designation | Method | Mean particle size, microns (volume distribution) | Standard Deviation | D(v, 0.9), microns | D(v, 0.5), microns | D(v, 0.1), microns | Aspect Ratio |
| --- | --- | --- | --- | --- | --- | --- | --- |
| PPE-A | Milling | 6.07 | 2.3 | 8.1 | 5.9 | 4.0 | 0.709 |
| PPE-B | Milling | 10.9 | 4.7 | 17.0 | 10.4 | 5.5 | 0.724 |
| PPE-C | Milling | 15.7 | 5.9 | 23.3 | 15.2 | 8.6 | 0.855 |
| PPE-D | Seive: U.S. standard No. 200 (metric size 75 μm) | 46.7 | 25.3 | 79.2 | 46.6 | 11.2 | 0.755 |
| PPE-E | Seive: U.S. standard No. 100 (metric size 150 μm) | 87.8 | 54.1 | 160.8 | 87.3 | 16.7 | 0.749 |

TABLE 2-continued

Properties of ultrafine PPE particles

| Designation | Method | Mean particle size, microns (volume distribution) | Standard Deviation | D(v, 0.9), microns | D(v, 0.5), microns | D(v, 0.1), microns | Aspect Ratio |
|---|---|---|---|---|---|---|---|
| PPE-F | Seive: U.S. standard No. 60 (metric size 250 μm) | 264.1 | 97.6 | 377.7 | 275.2 | 122.6 | 0.747 |

D(v, 0.1)—10% of the volume distribution is below this value
D(v, 0.5)—50% of the volume distribution is below this value
D(v, 0.9)—90% of the volume distribution is below this value The shape of the ultrafine PPE particles was examined by Scanning Electronic Microscopy (SEM). Samples were coated with gold and examined using a Carl Zeiss AG-EVO® 40 Series scanning electron microscope. The conditions were SEM mode, a probe current of 40 picoamps, HV (high vacuum), and an acceleration voltage of 20 kilovolts. The micrographs, as viewed under 1,000× magnification by scanning electron microscopy appear in FIG. 2-7. There are a great variety of shapes, which consisted in part of perturbed or irregular shaped ellipsoidal and spheroidal particles.

Particle size and shape distribution of PPE powders were determined using the Camsizer® XT from Retsch Technology GmbH operating in air dispersion mode. The particle size is reported as a circular equivalent diameter. Where the 3-dimensional particle is imaged as 2-dimensional particle, the area of 2-dimensional image is converted to a circle with equal area, and the diameter of the circle measured. The aspect ratio is calculated by dividing the breath by the length of the 2-dimensional image.

Particle size measurements are calibrated using a certified NIST traceable highly precise (±0.1 microns) standard provided by Retsch Technology. The reference object is an electron beam lithographic pattern that simulates the entire measuring dynamic range of differently sized particles (1-3000 microns).

The validation of particle size was carried out using a NIST traceable DRI-CAL particle size secondary standard. The standard is comprised of polystyrene/divinylbenzene polymeric beads (mean diameter; 23.2 microns±0.7 microns).

In one embodiment, 10 to 40 percent by weight of the ultrafine particulate poly(phenylene ether) is used. More particularly, 15 to 35 percent by weight of the ultrafine particulate poly(phenylene ether) is used. More particularly, 18 to 32 percent by weight of the ultrafine particulate poly(phenylene ether) is used.

Epoxy Resin

In addition to the ultrafine particulate poly(phenylene ether), the composition comprises an epoxy resin. As is known in the art, epoxy resins contain a reactive epoxide (oxirane) structure

Epoxy Resins Derived from Bisphenol A

In one embodiment, the epoxy resin is derived from the reaction of bisphenol A and epichlorohydrin is (2,2-bis[4-(2'3' epoxy propoxy) phenyl]propane), and is commonly called the diglycidyl ether of bisphenol A (DGEBPA).

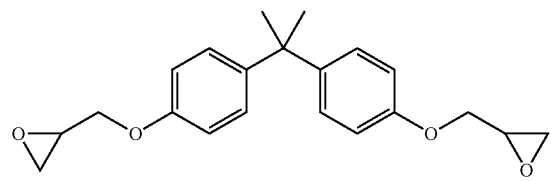 [SMILES: CC(C)(c1ccc(OCC2CO2)cc1)c1ccc(OCC2CO2)cc1]

In another embodiment, the epoxy resin is a higher molecular weight homolog of DGEBPA, as represented by structure:

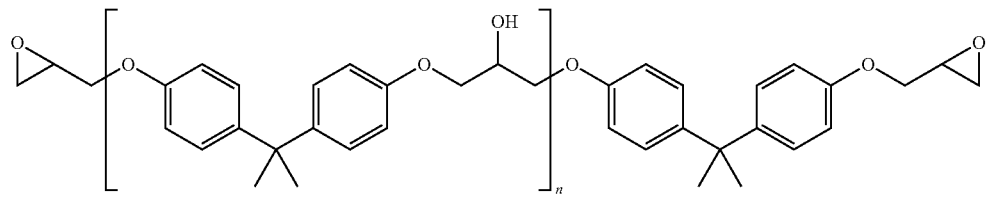

Bisphenol A-type epoxy resins in addition to DGEBPA that are suitable for use in the present invention have an epoxy equivalent weight (EEW) below 1400 g/equivalent and a melting point below 70° C. (NOTE: Around 80° C. it appears the PPE particles start to become soft presumably due to the epoxy acting as a solvent for PPE. Hence the need to stay below 80° C.) Some commercially available bisphenol A type epoxy resins that are suitable for use in the present invention include Epikote 828, 834, 827, 1001, 1002, 1004, Dow Epoxy DER 330, 331, 332, 317, 338, 6155, 662, 663U, and 662U (manufactured by Dow Chemical), Araldite 6071, 7071 and 7072 (manufactured by Ciba-Geigy), Epiclon 840, 850, 855, 860, 1050, 3050, 4050, and 7050 (manufactured by Dainippon Ink & Chemicals, Inc.), and the like.

Other Epoxy Resins

In addition to the bisphenol A-type epoxy resins, other epoxy resins are suitable for use in the present invention. Examples of other epoxy resins that can be used in the invention include the following, which may be used alone or in combination of two or more thereof:

Glycidylamine Type Epoxy Resins:

Epoxy resins having at least one N,N-diglycidylamino group, such as N,N,N',N'-tetraglycidylaminediphenyl-methane, N,N-diglycidylmeta-(or para-)aminophenol glycidyl ether and their condensation products. Some of them are commercially available in the name of Araldite MY 720 (manufactured by Ciba-Geigy), and Epotohto YH 434, YH 120 (manufactured by Toto Kasei K.K.).

Novolak Type Epoxy Resins:

Phenol-Novolak type epoxy resins, some of which are commercially available in the name of Epikote 152 and 154 (manufactured by Shell Chemical), Dow Epoxy Resin DEN 431, 438, 439 and 485 (manufactured by Dow Chemical), Ciba-Geigy EPN 1138 and 1139 (manufactured by Ciba-Geigy), and the like. Cresol novolak type epoxy resins, some of which are commercially available in the name of Ciba-Geigy ECN 1235, 1273, 1280, and 1299 (manufactured by Ciba-Geigy), EOCN 102, 103 and 104 (manufactured by Nippon Kagyosha K.K.), and the like.

Modified Bisphenol A Type Epoxy Resins:

Urethane-modified bisphenol A type epoxy resins, some of which are commercially available in the name of Adeka Resins EPV-6, EPV-9, and EPV-15 (manufactured by Asahi Denka Kogyo K.K.), and the like. Brominated bisphenol A type epoxy resins, some of which are commercially available in the name of Araldite 8011 (manufactured by Ciba-Geigy), Dow Epoxy Resin DER 511 (manufactured by Dow Chemical), and the like.

Alicyclic Epoxy Resins:

Alicyclic epoxy resins, some of which are commercially available in the name of Araldite CY-179, CY-178, CY-182, and CY-183 (manufactured by Ciba-Geigy), and the like.

Other Resins:

Epoxy resins derived from Bisphenol F, resorcinol, tetramethyl biphenol, tetrahydroxyphenylethane, polyalcohols, polyglycols, glycerin triethers, polyolefins, epoxylated soybean oil, and various esters resins are also know and available to the skilled artisan and may also be used in this invention.

Epoxy resins that are liquids at room temperature can be used as is. Solid resin can also be used by melting the resins, or alternatively, by liquefying the resins by mixing them with a liquid epoxy resin.

In one embodiment, 30 to 80 percent by weight of the epoxy resin is used. More particularly, 40 to 70 percent by weight of the epoxy resin is used. More particularly, 45 to 65 by weight of the epoxy resin is used.

Hardener

In addition to the ultrafine particulate poly(phenylene ether) and epoxy resin, the composition further comprises a hardener which is also known as a curing agent. Commercially available hardeners that can be used in the present invention include a variety of amine hardeners which are briefly described below.

In one embodiment, the hardener is a polyetheramine. Polyetheraimines include Jeffamine T-403 amine, Jeffamine D-230 amine.

In another embodiment, the hardener is a polyamide or amidoamine such as Versamid 125 polyamide, Genamid 490 amidoamine.

In another embodiment, the hardener is an aliphatic diamine. Aliphatic diamines include diethylenetriamine, triethylenetriamine, tetraethylenepentamine, N-aminoethylpiperazine, isophoronediamine, triethylenetetraamine, diethylenetriamine, aminoethylpiperazine, 1,2- and 1,3-diaminopropane, 2,2-dimethylpropylenediamine, 1,4-diaminobutane, 1,6-diaminohexane, 1,7-diaminoheptane, 1,8-diaminooctane, 1,9-diaminononane, 1,12-diaminododecane, 4-azaheptamethylenediamine, N,N'-bis(3-aminopropyl)butane-1,4-diamine, tetraethylenepentamine, 3-diethylaminopropylamine, 3,3'-iminobispropylamine, tetraethylenepentamine, 3-diethylaminopropylamine, 2,2,4- and 2,4,4-trimethylhexamethylenediamine.

In another embodiment, the hardener is a cycloaliphatic amine. Cycloaliphatic amines include bis-(p-aminocyclohexyl)methane, diaminocyclohexane, bis-(dimethyldiaminocyclohexyl)methane; 1,3-diaminocyclohexane, 1,4-diamino-3,6-diethylcyclohexane, 1,2-diamino-4-ethylcyclohexane, 1,4-diamino-3,6-diethylcyclohexane, 1-cyclohexyl-3,4-diminocyclohexane, 4,4'-diaminondicyclohexylmethane, 4,4'-diaminodicyclohexylpropane, 2,2-bis(4-aminocyclohexyl)propane, 3,3'-dimethyl-4,4'-diaminodicyclohexylmetliane, 3-amino-1-cyclohexaneaminopropane, 1,3- and 1,4-bis(aminomethyl)cyclohexane.

In another embodiment, the hardener is an aromatic amine. Aromatic amines include diaminophenylsulfone, 4,4'-methylenedianiline, diethyltoluenediamine, m-phenylenediamine, p-phenylenediamine, 2,4-bis(p-aminobenzyl)aniline, m- and p-xylylenediamine, diethyl toluene diamines, and mixtures thereof.

In another embodiment, the hardener is an anhydride curing agent. Anhydride curing agents include nadic methyl anhydride (NMA), hexahydrophthalic anhydride (HHPA), trimellitic anhydride (TMA), dodecenyl succinic anhydride (DDSA), phthalic anhydride (PA), methyl hexahydrophthalic anhydride (MHHPA), tetrahydrophthalic anhydride (THPA), methyl tetrahydrophthalic anhydride (MTHPA), chlorendic anhydride (HET), mellitic anhydride, and benzophenonetetracarboxylic dianhydride (BTDA).

In another embodiment, the hardener is a Lewis base. Lewis bases include tertiary amines and imidazoles which are commonly used as epoxy-anhydride catalysts or accelerators. In general, they are used in the range of 0.5 to 3.0% to speed up the cure. Some commonly used accelerators are 2,4,6-tris(dimethylaminomethyl)phenol, N,N-dimethyl-1-phenylmethanamine, 2-methylimidazole, 2-ethyl imidazole, 2-laurylimidazole, 2-heptadecylimidazole, 2-phenylimidazole, 4-methylimidazole, 4-ethylimidazole, 4-laurylimidazole, 4-heptadecylimidazole, 2-phenyl-4-methylimidazole, 2-phenyl-4-hydroxymethylimidazole, 2-ethyl-4-methylimidazole, 2-ethyl-4-hydroxymethylimidazole, 1-cyanoethyl-4-methylimidazole, 2-phenyl-4,5-dihydroxymethylimidazole, and the like, and mixtures thereof.

In one embodiment, the hardener is 4,4'-diaminodiphenyl methane (MDA).

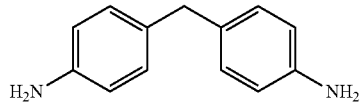 [SMILES: Nc1ccc(Cc2ccc(N)cc2)cc1]

In this and other embodiments, 1 to 30 percent by weight of the hardener is used. More particularly, 5 to 25 percent by weight of the hardener is used. More particularly, 10 to 20 percent by weight of the hardener is used.

Other Components

The formulation can also contain non-reactive diluents such as dioctyl phthalate, nonyl phenol, dibutyl phthalate, furfuryl alcohol, pine oil, coal tar, castor oil, and hydrocarbon oils. The formulation can also contain reactive diluents such as diglycidylether of 1,4 butane diol, epoxidized soybean oil, epoxidized castor oil, diglycidyl ether of neopentyl glycol, 2-ethylhexyl glycidyl ether, butyl glycidyl ether, phenyl glycidyl ether, t-butyl glycidyl ether, o-cresyl glycidyl ether, nonyl phenol glycidyl ether, cyclohexane dimethanol diglycidyl ether, trimethylol ethane triglycidyl ether, and trimethylol propane triglycidyl ether. The formulation can also contain glass fibers, carbon fibers, glass flakes, glass beads, clays, talcs, micas, silicas, aluminas, titanium dioxides, wollastonites, calcium carbonates, calcium sulfates, barium sulfates, dolomites, processed mineral fibers, metal oxides, metal hydroxides, ceramic fibers, and combinations thereof.

Mixing Techniques

In order to optimize performance of ultrafine PPE particles with a liquid thermoset monomer, it is important to get a good dispersion of PPE particles and degas the PPE/monomer slurry before curing. Techniques include: Planetary Centrifugal Vacuum Mixer such as the THINKY MIXERS available from THINKY USA; Vacuum mixers such as Double Planetary Vacuum Mixers available from Charles Ross & Son Company; and the use of a high speed blender or an ultrasonic bath for dispersion followed by the use of a vacuum oven for degassing.

Other Thermoset Resins

In addition to epoxy resins, this technique would be suitable for use in other thermoset resins such as cyanate esters, benzoxazines, and some radical cured vinyl monomers (diallyl phthalate, triallyl isocyanurate and triallyl cyanurate). Since styrene monomer is a good solvent for PPE, this technique would not be suitable styrenic based systems (unsaturated polyesters).

Composition

In one embodiment, the composition comprises: Ultrafine particles of poly(phenylene ether) such that the mean particle size (volume distribution) is less than 40 microns In another embodiment, the composition comprises:
(a) Ultrafine particles of poly(phenylene ether) wherein the ultrafine particulate poly(phenylene ether) has a mean particle size of 6 microns.
(b) Ultrafine particles of poly(phenylene ether) wherein 90 percent of the particle volume distribution of the ultrafine particulate poly(phenylene ether) is below 8 microns.
(c) Ultrafine particles of poly(phenylene ether) wherein 50 percent of the particle volume distribution of the ultrafine particulate poly(phenylene ether) is below 6 microns.

In another embodiment, the composition comprises:
(a) Ultrafine particles of poly(phenylene ether) wherein the ultrafine particulate poly(phenylene ether) has a mean particle size of 10 microns.
(b) Ultrafine particles of poly(phenylene ether) wherein 90 percent of the particle volume distribution of the ultrafine particulate poly(phenylene ether) is below 17 microns.
(c) Ultrafine particles of poly(phenylene ether) wherein 50 percent of the particle volume distribution of the ultrafine particulate poly(phenylene ether) is below 10 microns.

In another embodiment, the composition comprises:
(a) Ultrafine particles of poly(phenylene ether) wherein the ultrafine particulate poly(phenylene ether) has a mean particle size of 15 microns.
(b) Ultrafine particles of poly(phenylene ether) wherein 90 percent of the particle volume distribution of the ultrafine particulate poly(phenylene ether) is below 23 microns.

In one embodiment, the composition comprises:
(a) 5 to 40 percent by weight of the ultrafine particulate poly(phenylene ether), wherein the mean particle size of the poly(phenylene ether) is 4 to 50 microns;
(b) 30 to 80 percent by weight of an epoxy resin; and
(c) 1 to 30 percent by weight of a hardener.

In another embodiment, the composition comprises:
(a) 10 to 35 percent by weight of the ultrafine particulate poly(phenylene ether), wherein the mean particle size of the poly(phenylene ether) is 5-40;
(b) 40 to 70 percent by weight of an epoxy resin; and
(c) 5 to 25 percent by weight of a hardener.

In another embodiment, the composition comprises:
(a) 15 to 30 percent by weight of the ultrafine particulate poly(phenylene ether), wherein the mean particle size of the poly(phenylene ether) is 6-30;
(b) 40 to 70 percent by weight of an epoxy resin; and
(c) 5 to 25 percent by weight of a hardener.

In one embodiment, the composition comprises ultrafine particles of poly(phenylene ether), wherein the ultrafine particulate poly(phenylene ether) has a mean particle size of 6 microns. In a further embodiment, 90 percent of the particle volume distribution of the ultrafine particulate poly(phenylene ether) is below 8 microns. In a further embodiment, 50 percent of the particle volume distribution of the ultrafine particulate poly(phenylene ether) is below 6 microns.

In these and other embodiments, the poly(phenylene ether) is a particulate poly(phenylene ether) having a mean particle size of 6 microns. In these and other embodiments, the poly(phenylene ether) is a particulate poly(phenylene ether) having a mean particle size of 11 microns. In these and other embodiments, the poly(phenylene ether) is a particulate poly(phenylene ether) having a mean particle size of 16 microns. In these and other embodiments, the poly(phenylene ether) is poly(phenylene ether) having a mean particle size of 6 to 10 microns. In these and other embodiments, the poly(phenylene ether) is a particulate poly(phenylene ether) having a mean particle size of 6 to 16 microns. In these and other embodiments, the poly(phenylene ether) is a particulate poly(phenylene ether) having a mean particle size of 11 to 16 microns.

In these and other embodiments, the epoxy resin is a resin derived from bisphenol A. More particularly, the resin is DGEBPA.

In another embodiment, the composition comprises:
(a) 10 to 40 percent by weight of the ultrafine particulate poly(phenylene ether), wherein the mean particle size of the poly(phenylene ether) is 9 microns or less;
(b) 60 to 90 percent by weight of an epoxy resin;
wherein the weight percents are based on the total weight of the composition.

In another embodiment, the composition further comprises a hardener.

In another embodiment, the poly(phenylene ether) is poly(2,6-dimethyl-1,4-phenylene ether) having an intrinsic viscosity of between 0.30 deciliters to 1.5 deciliters per gram, measured in chloroform at 25° C.

In another embodiment, the ultrafine particles of poly (phenylene ether) have a mean particle size of 3.8 microns to 8.4 microns.

In another embodiment, the ultrafine particles of poly (phenylene ether) of having a mean particle size of 6 microns.

In another embodiment, 90 percent of the particle volume distribution of the ultrafine particulate poly(phenylene ether) is below 8 microns.

In another embodiment, the composition of comprises:
(a) 10 to 40 percent by weight of the ultrafine particulate poly(phenylene ether);
(b) 30 to 80 percent by weight of an epoxy resin; and
(c) 1 to 30 percent by weight of a hardener.

In another embodiment, the composition of comprises:
(a) 15 to 35 percent by weight of the ultrafine particulate poly(phenylene ether);
(b) 30 to 80 percent by weight of DGEBPA; and
(c) 5 to 25 percent by weight of MDA; wherein the impact strength of the composition is greater than or equal to 500 J/m as measured by ASTM D4812.

In these and other embodiments, the hardener is MDA.

In another embodiment, the composition as described herein does not comprise an organophosphorous compound.

Process

In another aspect, the invention is also directed to a process for preparing a composition comprising:
(a) 15 to 35 percent by weight of the ultrafine particulate poly(phenylene ether), wherein the mean particle size of the poly(phenylene ether) is 6 to 40 microns;
(b) 40 to 70 percent by weight of an epoxy resin; and
(c) 5 to 25 percent by weight of a hardener; comprising the steps of:
  (i) combining the poly(phenylene ether) and epoxy resin at ambient temperature to form a mixture;
  (ii) adding the hardener to the mixture of (i);
  (iii) heating the mixture of (ii) from ambient to 200° C.

This process further comprises blending the step (i) mixture to form a dispersion. Any method of forming a dispersion that is known to the skilled artisan can be used, but typically, the dispersion is formed by blending the mixture. In a further embodiment, the process comprises degassing the mixture of step (i) at reduced pressure. In a further embodiment, the process comprises blending the step (i) mixture to form a dispersion; and then degassing the resulting blended mixture at reduced pressure.

In another aspect, the invention is also directed to a process for preparing a composition comprising:
(a) 10 to 40 percent by weight of the ultrafine particulate poly(phenylene ether), wherein the mean particle size of the poly(phenylene ether) is 6 to 40 microns;
(b) 30 to 80 percent by weight of an epoxy resin; and
(c) 1 to 30 percent by weight of a hardener; comprising the steps of:
  (i) combining the poly(phenylene ether) and epoxy resin at ambient temperature to form a mixture;
  (ii) blending the mixture to form a dispersion;
  (iii) degassing the mixture of (ii) at reduced pressure;
  (iv) adding the hardener to the mixture of (iii);
  (v) heating the mixture of (iv) from ambient to 200° C.

In another aspect, the invention is also directed to a process for preparing a composition comprising:
(a) 15 to 35 percent by weight of the ultrafine particulate poly(phenylene ether), wherein the mean particle size of the poly(phenylene ether) is 6 to 40 microns;
(b) 40 to 70 percent by weight of an epoxy resin; and
(c) 5 to 25 percent by weight of a hardener; comprising the steps of:
  (i) combining the poly(phenylene ether) and epoxy resin at ambient temperature to form a mixture;
  (ii) blending the mixture to form a dispersion;
  (iii) degassing the mixture of (ii) at reduced pressure;
  (iv) adding the hardener to the mixture of (iii);
  (v) heating the mixture of (iv) from ambient to 200° C.

In another embodiment, the process further comprises heating the mixture from room temperature to 200° C. for a sufficient time to produce a material with an impact strength that is greater than or equal to 500 J/m as measured by ASTM D4812.

In another embodiment, the process further comprises heating the mixture from room temperature to 200° C. for a sufficient time to produce a casting with uniform density and an impact strength is greater than or equal to 500 J/m as measured by ASTM D4812. "Uniform density" means that the density distribution between the top of the casting and the bottom of the casting is less than or equal to 0.1 percent.

In another embodiment, the invention is also directed to a process for preparing a composition comprising:
(a) 15 to 35 percent by weight of the ultrafine particulate poly(phenylene ether), wherein the mean particle size of the poly(phenylene ether) is 6 to 40 microns;
(b) 40 to 70 percent by weight of DGEBPA; and
(c) 5 to 25 percent by weight of MDA; comprising the steps of:
  (i) combining the poly(phenylene ether) and DGEBPA at ambient temperature to form a mixture;
  (ii) blending the mixture to form a dispersion;
  (iii) degassing the mixture of (ii) at reduced pressure;
  (iv) adding MDA to the mixture of (iii);
  (v) heating the mixture of (iii) from ambient to 200° C.

In another embodiment, the invention is also directed to a process for preparing a composition comprising:
(a) 15 to 35 percent by weight of the ultrafine particulate poly(phenylene ether), wherein the mean particle size of the poly(phenylene ether) is 6 to 40 microns;
(b) 40 to 70 percent by weight of DGEBPA; and
(c) 5 to 25 percent by weight of MDA; comprising the steps of:
  (i) combining the poly(phenylene ether) and DGEBPA at ambient temperature to form a mixture;
  (ii) blending the mixture to form a dispersion;
  (iii) degassing the mixture of (ii) at reduced pressure;
  (iv) adding MDA to the mixture of (iii);
  (v) heating the mixture of (iv) from ambient to 200° C. to produce a casting with uniform density and an impact strength is greater than or equal to 500 J/m as measured by ASTM D4812.

In another embodiment, the invention is also directed to a process for preparing a composition comprising:
(a) 15 to 35 percent by weight of the ultrafine particulate poly(phenylene ether), wherein the mean particle size of the poly(phenylene ether) is 6 to 40 microns;
(b) 40 to 70 percent by weight of DGEBPA; and
(c) 5 to 25 percent by weight of MDA; comprising the steps of:
  (i) combining the poly(phenylene ether) and epoxy resin at ambient temperature to form a mixture;
  (ii) adding the hardener to the mixture of (i);
  (iii) heating the mixture of (ii) from 50 to 200° C. to produce a casting with uniform density and an impact strength is greater than or equal to 500 J/m as measured by ASTM D4812.

This process further comprises blending the step (i) mixture to form a dispersion. In a further embodiment, the process comprises degassing the mixture of step (ii) at reduced pressure. In a further embodiment, the process comprises blending the step (i) mixture to form a dispersion; and degassing the mixture of step (ii) at reduced pressure.

In another embodiment, the invention is directed to a process for preparing a composition comprising:
(a) 15 to 35 percent by weight of the ultrafine particulate poly(phenylene ether), wherein the particle size of the poly(phenylene ether) is 10 to 40 microns;

(b) 40 to 70 percent by weight of an epoxy resin; and
(c) 5 to 25 percent by weight of a hardener; comprising the steps of:
  (i) combining the poly(phenylene ether) and epoxy resin at 40° C. or lower to form a mixture;
  (ii) adding the hardener to the mixture of (i);
  (iii) heating the mixture of (ii) from ambient to 200° C.

In this and other embodiments, the hardener can be:
(a) an aromatic diamine;
(b) an aliphatic diamine;
(c) a mixture of (a) and (b);
(d) a carboxylic anhydride;
(e) an imidazole; or
(f) a metal acetyl acetonate.

Article

In another aspect, the invention is directed to an article prepared from a composition comprising any of the embodiments of the composition described previously.

More particularly, the invention is directed to an article prepared from a composition comprising:
(a) 15 to 35 percent by weight of the ultrafine particulate poly(phenylene ether), wherein the mean particle size of the poly(phenylene ether) is 9 microns or less;
(b) 40 to 70 percent by weight of an epoxy resin; and
(c) 5 to 25 percent by weight of a hardener;
by a process comprises the steps of (i) combining the poly(phenylene ether), epoxy resin and hardener to form a mixture; (ii) heating the mixture from room temperature to 200° C. for a sufficient time to produce a casting with uniform density and an impact strength is greater than or equal to 500 J/m as measured by ASTM D4812.

The following examples illustrate the scope of the invention. The examples and preparations which follow are provided to enable those skilled in the art to more clearly understand and to practice the present invention. They should not be considered as limiting the scope of the invention, but merely as being illustrative and representative thereof.

EXAMPLES

The materials used to prepare the compositions are listed in Table 2.

TABLE 2

| Component | Trade name and Supplier |
|---|---|
| PPE | Poly(2,6-dimethyl-1,4-phenylene ether), CAS Reg. No. 24938-67-8, having an intrinsic viscosity of 0.4 deciliters per gram, measured in chloroform at 25° C., and obtained as PPO 640 resin from SABIC. ("0.4 IV PPE) |
| Epoxy Resin | Diglycidyl Ether of Bisphenol A ("DGEBPA"), 2,2'-[methylethylidenebis(4,1-phenyleneoxymethylene)]bisoxirane, CAS Reg. No. 001675-54-3, obtained from Dow Chemical Company as DER332. |
| Hardener | 4,4'-diaminodiphenyl methane ("MDA"), CAS Reg. No. 101-77-9, obtained from Sigma Aldrich Co. |

The particle size of the PPE samples and their designations are summarized in Table 3.

TABLE 3

| PPE | Mean Particle Size (micrometer) |
|---|---|
| PPE-A | 6.07 |
| PPE-B | 10.9 |
| PPE-C | 15.7 |
| PPE-D | 46.7 |

TABLE 3-continued

| PPE | Mean Particle Size (micrometer) |
|---|---|
| PPE-E | 87.8 |
| PPE-F | 264.1 |

The ASTM and UL tests used to characterize the compositions of the present invention, and the comparative examples, are summarized below in Table 4.

TABLE 4

| Test | Description |
|---|---|
| Un-notched Izod Impact | Un-notched Izod values, expressed in units of joules per meter, were determined according to ASTM D4812, at a temperature of 23° C., a hammer energy of 2 foot-pounds (2.711 joules), |
| Density | Density values, expressed in units of grams per cubic centimeter, were determined according to ASTM D 792-08 at 23° C. |

Ultrafine PPE Particles

Ultrafine PPE particles were obtained from two sources. Different particle sizes were obtained by sieving commercial PPO640. Samples collected from sieve pans U.S. Standard No. 200 (metric size 75 microns), No. 100 (150 microns), and No. 60 (250 microns) were used to prepare castings. These powders will have the designation PPE-D, PPE-E, and PPE-F, respectively. The other source of ultrafine PPE was obtained by milling commercial PPO640. Hence, ultrafine PPE was obtained with mean particle size distributions of about 6, 11, and 16 microns. These powders have the designations PPE-A, PPE-B, and PPE-C, respectively.

General Procedure for Sample Prepared with Ultrafine PPE Castings

Ultrafine PPE (for example, PPE-B) powder was added with mixing to epoxy resin at ambient temperatures. The resultant slurry was placed in a blender to increase the dispersion of PPE in the epoxy resin. The blender used was a Waring explosion proof blender (Model 36BL54) operating at 10,500 rpm. Typical condition was about 30 seconds of blending. The slurry was transferred to a beaker and placed in a vacuum oven to degas. The degassing operation was performed at ambient temperatures at 24-27 inches vacuum.

To the degassed slurry was added the diamine hardener. The slurry was warmed to dissolve the hardener. After mixing in the dissolved hardener, the slurry was placed in a vacuum oven and degassed at 40-80° C. and 24-27 inches vacuum. The degassed slurry was transferred into a mold that was preheated to 100° C., which was placed in an oven at 100° C. After 2 hours the oven temperature was increased to 190° C. After 3 hours the oven was turned off and allowed to cool to room temperature overnight.

The casting was removed from the mold and test parts were cut.

Modified Procedure for Sample Prepared with Ultrafine PPE-F (264 micron) Castings This modified procedure was used to prepare castings made with the larger PPE particles, PPE-F, to circumvent the tendency for the larger particles to rise to the surface of the liquid epoxy resin. PPE-F powder was added with mixing to epoxy resin at ambient temperatures. The resultant slurry was placed in a blender to increase the dispersion of PPE in the epoxy resin. The blender used was a Waring explosion proof blender (Model 36BL54) operating at 10,500 rpm.

Typical condition was about 30 seconds of blending. The slurry was transferred to a beaker and placed in a vacuum oven to degas. The degassing operation was performed at ambient temperatures at 24-27 inches vacuum.

To the degassed slurry was added the diamine hardener. The slurry was warmed to dissolve the hardener. After mixing in the dissolved hardener, the slurry was allowed to thicken slightly by stirring for 30-60 minutes at 50-70° C. Then the slurry was placed in a vacuum oven and degassed at 40-80° C. and 24-27 inches vacuum. The degassed slurry was transferred into a mold that was preheated to 100° C., which was placed in an oven at 100° C. After 2 hours the oven temperature was increased to 190° C. After 3 hours the oven was turned off and allowed to cool to room temperature overnight.

The casting was removed from the mold and test parts were cut.

Post Cure Procedure for Samples Prepared with Ultrafine PPE Castings

PPE powder was added with mixing to epoxy resin at ambient temperatures. The resultant slurry was placed in a blender to increase the dispersion of PPE in the epoxy resin. The blender used was a Waring explosion proof blender (Model 36BL54) operating at 10,500 rpm. Typical condition was about 30 seconds of bending. The slurry was transferred to a beaker and placed in a vacuum oven to degas. The degassing operation was performed at ambient temperatures at 24-27 inches vacuum.

To the degassed slurry was added the diamine hardener. The slurry was warmed to dissolve the hardener. After mixing in the dissolved hardener, the slurry was placed in a vacuum oven and degassed at 40-80° C. and 24-27 inches vacuum. The degassed slurry was transferred into a mold that was preheated to 100° C., which was placed in an oven at 100° C. After 2 hours the oven temperature was increased to 190° C. After 3 hours the oven temperature was increased to the post curing temperature (220, 240, or 260° C.). After 15 minutes at the post cure temperature, the oven was turned off and allowed to cool to room temperature overnight. The casting was removed from the mold and test parts were cut.

General Procedure for Control Sample

To the epoxy resin was added the diamine hardener. The mixture was warmed to dissolve the hardener. After mixing in the dissolved hardener, the solution was placed in a vacuum oven and degassed at 40-80° C. and 24-27 inches vacuum. The degassed solution was transferred into a mold that was preheated to 100° C., which was placed in an oven at 100° C. After 2 hours the oven temperature was increased to 190° C. After 3 hours the oven was turned off and allowed to cool to room temperature overnight.

The casting was removed from the mold and test parts were cut. Impact strength was determined by pendulum impact testing (un-notched Izod)

Description of Comparative Examples

A description of each of the comparative examples is provided in Table 5A and 5B.

TABLE 5A

| Comparative Examples | | |
|---|---|---|
| Comparative Example | Description | Synthesis |
| A | Control with no PPE | Following the General Procedure for control sample, 41.19 grams of MDA was mixed and dissolved in 158.81 grams DGEBPA to produce a casting (Control) |
| B | 20 wt % PPE-F | Following the General Procedure for sample prepared with ultrafine PPE casting, 40.0 grams of PPE-F was slurred in 127.0 grams DGEBPA and cure with 33.0 grams MDA. |
| C | 20 wt % PPE-E | Following the General Procedure for sample prepared with ultrafine PPE casting, 40.0 grams of PPE-E was slurred in 127.0 grams DGEBPA and cure with 33.0 grams MDA. |
| D | 20 wt % PPE-D | Following the General Procedure for sample prepared with ultrafine PPE casting, 40.0 grams of PPE-D was slurred in 127.0 grams DGEBPA and cure with 33.0 grams MDA |
| E | 15 wt % PPE-E | Following the General Procedure for sample prepared with ultrafine PPE casting, 30.0 grams of PPE-F was slurred in 134.9 grams DGEBPA and cure with 35.0 grams MDA. |
| F | 15 wt % PPE-F | Following the Modified Procedure for sample prepared with ultrafine PPE casting, 30.0 grams of PPE-E was slurred in 134.9 grams DGEBPA and cure with 35.0 grams MDA. |
| G | 15 wt % PPE-D | Following the General Procedure for sample prepared with ultrafine PPE casting, 30.0 grams of PPE-D was slurred in 134.9 grams DGEBPA and cure with 35.0 grams MDA. |

TABLE 5B

| Comparative Examples | | |
|---|---|---|
| Comparative Example | Description | Synthesis |
| H | 10 wt % PPE-F | Following the Modified Procedure for sample prepared with ultrafine PPE casting, 20.0 grams of PPE-F was slurred in 142.88 grams DGEBPA and cure with 37.06 grams MDA. |
| I | 10 wt % PPE-E | Following the General Procedure for sample prepared with ultrafine PPE casting, 20.0 grams of PPE-E was slurred in 142.88 grams DGEBPA and cure with 37.06 grams MDA. |
| J | 10 wt % PPE-D | Following the General Procedure for sample prepared with ultrafine PPE casting, 20.0 grams of PPE-D was slurred in 142.88 grams DGEBPA and cure with 37.06 grams MDA. |

TABLE 5B-continued

Comparative Examples

| Comparative Example | Description | Synthesis |
|---|---|---|
| K | 5 wt % PPE-F | Following the Modified Procedure for sample prepared with ultrafine PPE casting, 10.0 grams of PPE-F was slurred in 150.81 grams DGEBPA and cure with 39.19 grams MDA |
| L | 5 wt % PPE-E | Following the General Procedure for sample prepared with ultrafine PPE casting, 10.0 grams of PPE-E was slurred in 150.81 grams DGEBPA and cure with 39.19 grams MDA |
| M | 5 wt % PPE-D | Following the General Procedure for sample prepared with ultrafine PPE casting, 10.0 grams of PPE-D was slurred in 150.81 grams DGEBPA and cure with 39.19 grams MDA. |
| N | 25 wt % PPE-E | Following the General Procedure for sample prepared with ultrafine PPE casting, 50.0 grams of PPE-E was slurred in 119.06 grams DGEBPA and cure with 30.94 grams MDA. |
| O | 25 wt % PPE-D | Following the General Procedure for sample prepared with ultrafine PPE casting, 50.0 grams of PPE-D was slurred in 119.06 grams DGEBPA and cure with 30.94 grams MDA. |

A description of each of the examples is provided in Table 6A-C.

TABLE 6A

Examples

| Example | Description | Synthesis |
|---|---|---|
| 1 | 20 wt % PPE-C | Following the General Procedure for sample prepared with ultrafine PPE casting, 40.0 grams of PPE-C was slurred in 127.0 grams DGEBPA and cure with 33.0 grams MDA |
| 2 | 20 wt % PPE-B | Following the General Procedure for sample prepared with ultrafine PPE casting, 40.0 grams of PPE-B was slurred in 127.0 grams DGEBPA and cure with 33.0 grams MDA |
| 3 | 15 wt % PPE-C | Following the General Procedure for sample prepared with ultrafine PPE casting, 30.0 grams of PPE-C was slurred in 134.9 grams DGEBPA and cure with 35.0 grams MDA. |
| 4 | 15 wt % PPE-B | Following the General Procedure for sample prepared with ultrafine PPE casting, 30.0 grams of PPE-B was slurred in 134.9 grams DGEBPA and cure with 35.0 grams MDA. |
| 5 | 15 wt % PPE-A | Following the General Procedure for sample prepared with ultrafine PPE casting, 30.0 grams of PPE-A was slurred in 134.9 grams DGEBPA and cure with 35.0 grams MDA. |

TABLE 6B

Examples

| Example | Description | Synthesis |
|---|---|---|
| 6 | 10 wt % PPE-C | Following the General Procedure for sample prepared with ultrafine PPE casting, 20.0 grams of PPE-C was slurred in 142.88 grams DGEBPA and cure with 37.06 grams MDA |
| 7 | 10 wt % PPE-B | Following the General Procedure for sample prepared with ultrafine PPE casting, 20.0 grams of PPE-B was slurred in 142.88 grams DGEBPA and cure with 37.06 grams MDA |
| 8 | 10 wt % PPE-A | Following the General Procedure for sample prepared with ultrafine PPE casting, 20.0 grams of PPE-A was slurred in 142.88 grams DGEBPA and cure with 37.06 grams MDA |
| 9 | 5 wt % PPE-C | Following the General Procedure for sample prepared with ultrafine PPE casting, 10.0 grams of PPE-C was slurred in 150.81 grams DGEBPA and cure with 39.19 grams MDA. |
| 10 | 5 wt % PPE-B | Following the General Procedure for sample prepared with ultrafine PPE casting, 10.0 grams of PPE-B was slurred in 150.81 grams DGEBPA and cure with 39.19 grams MDA. |
| 11 | 5 wt % PPE-A | Following the General Procedure for sample prepared with ultrafine PPE casting, 10.0 grams of PPE-A was slurred in 150.81 grams DGEBPA and cure with 39.19 grams MDA. |
| 12 | 25 wt % PPE-B | Following the General Procedure for sample prepared with ultrafine PPE casting, 50.0 grams of PPE-B was slurred in 150.81 grams DGEBPA and cure with 30.94 grams MDA. |

TABLE 6C

Examples (Post Curing)

| Example | Description | Synthesis |
|---|---|---|
| 13 | 20 wt % PPE-B Post cured at 220° C. | Following the Post-cure Procedure for sample prepared with ultrafine PPE casting, 40.0 grams of PPE-B was slurred in 129.0 grams DGEBPA and cure with 31.0 grams MDA |
| 14 | 20 wt % PPE-B Post cured at 240° C. | Following the Post-cure Procedure for sample prepared with ultrafine PPE casting, 40.0 grams of PPE-B was slurred in 129.0 grams DGEBPA and cure with 31.0 grams MDA |
| 15 | 20 wt % PPE-B Post cured at 260° C. | Following the Post-cure Procedure for sample prepared with ultrafine PPE casting, 40.0 grams of PPE-B was slurred in 129.0 grams DGEBPA and cure with 31.0 grams MDA |

A summary of the results for the 20 weight percent is provided in Table 7. For Comparative Example B, the mean particle size was 264.1 microns. The particles were effectively so large that they rose to the surface in the liquid epoxy resin, as reflected in the Density Difference measurement. In contrast, Examples 1 and 2, having mean particle sizes of 15.7 and 10.9 microns, provided castings with uniform densities as compared to Comparative Example A (Control). Examples 1 and 2 also gave castings with increased toughness as measured as greater impact strength according to ASTM D4812 (Un-notched Izod Impact Test at a temperature of 23° C., a hammer energy of 2 foot-pounds (2.711 joules)) relative to the Comparative Example A, B, C, and D.

The presence of two discreet phases was supported by glass transition temperatures (Tg) determination. Tgs were measured by differential scanning calorimetry (DSC) on a TA Instruments 2920 M-DS. The thermal scans were from 30 to 250° C. under a nitrogen atmosphere with a heating rate of 20° C./min. Comparative Example A exhibited Tg values of 159.3° C. The Examples 1 and 2 exhibited two distinct Tg values around 160 and 216° C. PPE has a Tg of about 215° C.

Figure 8:
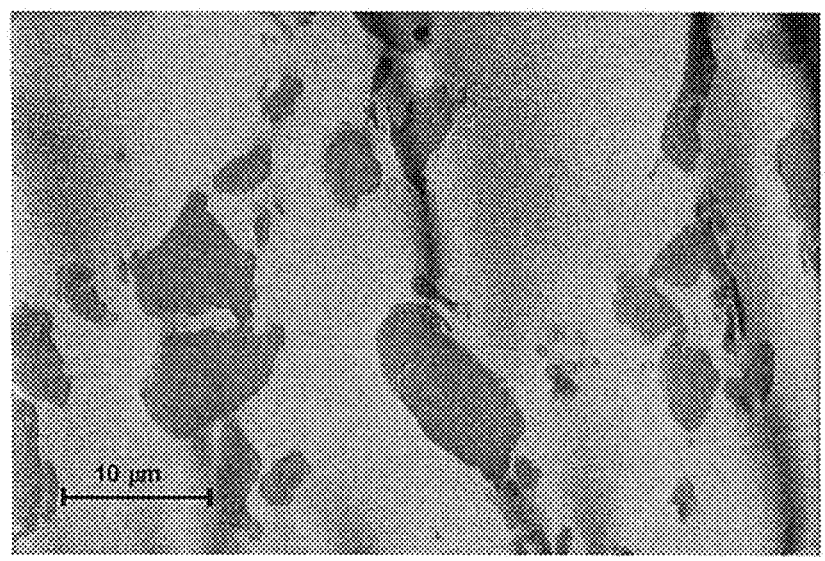
FIG. 8 is a STEM in SEM of 20 wt % PPE-B in a cured epoxy resin.

The morphology of the casting from Example 2 was investigated by scanning transmission electron microscopy. The microtomed surface were stained with osmium tetraoxide and ruthenium tetraoxide and observed with a Zeiss EVO40 XVP scanning electron microscope with scanning transmission electron microscopy module. A representative micrograph appears in FIG. 8. The dark domains are PPE-B which are s well dispersed and there is no indication of agglomeration.

TABLE 7

|  | CE-A | CE-B | CE-C | CE-D | EX-1 | EX-2 |
|---|---|---|---|---|---|---|
| PPE Weight Percent | 0 | 20 | 20 | 20 | 20 | 20 |
| PPE Mean particle size (microns) | — | 264.1 | 87.8 | 46.7 | 15.7 | 10.9 |
| Impact Strength (J/m) | 491 | 141 | 351 | 396 | 591 | 633 |
| Density Difference (%) Between Casting Top and Bottom | <0.05 | 4.1 | <0.05 | <0.05 | <0.05 | <0.05 |
| Glass Transition | 159.3 | — | — | — | 159.7, | 159.5, |

TABLE 7-continued

|  | CE-A | CE-B | CE-C | CE-D | EX-1 | EX-2 |
|---|---|---|---|---|---|---|
| Temperature(s) (° C.) |  |  |  |  | 216.4 | 215.7 |

A summary of the results for the 15 weight percent is provided in Table 8. Examples 3, 4, and 5 gave castings with increased toughness as measured as impact strength according to ASTM D4812 (Un-notched Izod Impact Test) relative to the Comparative Example A, and Comparative Examples E, F, and G gave castings with decreased toughness relative to the Comparative Example A.

TABLE 8

|  | CE-A | CE-E | CE-F | CE-G | EX-3 | EX-4 | EX-5 |
|---|---|---|---|---|---|---|---|
| PPE Weight Percent | 0 | 15 | 15 | 15 | 15 | 15 | 15 |
| PPE Mean particle size (microns) | — | 264.1 | 87.8 | 46.7 | 15.7 | 10.8 | 6.07 |
| Impact Strength (J/m) | 491 | 209 | 383 | 423 | 586 | 620 | 659 |

A summary of the results for the 10 weight percent is provided in Table 9. Examples 6, 7, and 8 gave castings with increased toughness as measured as impact strength according to ASTM D4812 (Un-notched Izod Impact Test) at relative to the Comparative Example A, and Comparative Examples H, I, and J gave castings with decreased toughness relative to the Comparative Example A.

TABLE 9

|  | CE-A | CE-H | CE-I | CE-J | EX-6 | EX-7 | EX-8 |
|---|---|---|---|---|---|---|---|
| PPE Weight Percent | 0 | 10 | 10 | 10 | 10 | 10 | 10 |
| PPE Mean particle size (microns) | — | 264.1 | 87.8 | 46.7 | 15.7 | 10.8 | 6.07 |
| Impact Strength (J/m) | 491 | 293 | 418 | 448 | 573 | 607 | 630 |

A summary of the results for the 5 weight percent is provided in Table 10. Examples 9, 10, and 11 gave castings with increased toughness as measured as impact strength according to ASTM D4812 (Un-notched Izod Impact Test) at relative to the Comparative Example A, and Comparative Examples K, L, and M gave castings with decreased toughness relative to the Comparative Example A.

TABLE 10

|  | CE-A | CE-K | CE-L | CE-M | EX-9 | EX-10 | EX-11 |
|---|---|---|---|---|---|---|---|
| PPE Weight Percent | 0 | 5 | 5 | 5 | 5 | 5 | 5 |
| PPE Mean particle size (microns) | — | 264.1 | 87.8 | 46.7 | 15.7 | 10.8 | 6.07 |
| Impact Strength (J/m) | 491 | 383 | 451 | 471 | 553 | 573 | 585 |

A summary of the results for the 25 weight percent is provided in Table 11. Example 12 gave a casting with increased toughness as measured as impact strength according to ASTM D4812 (Un-notched Izod Impact Test) at relative to the Comparative Example A, and Comparative Examples N, and O gave castings with decreased toughness relative to the Comparative Example A.

TABLE 11

|  | CE-A | CE-N | CE-O | EX-12 |
|---|---|---|---|---|
| PPE Weight Percent | 0 | 25 | 25 | 25 |
| PPE Mean particle size (microns) | — | 87.8 | 46.7 | 10.8 |
| Impact Strength (J/m) | 491 | 322 | 367 | 644 |

Figure 9:
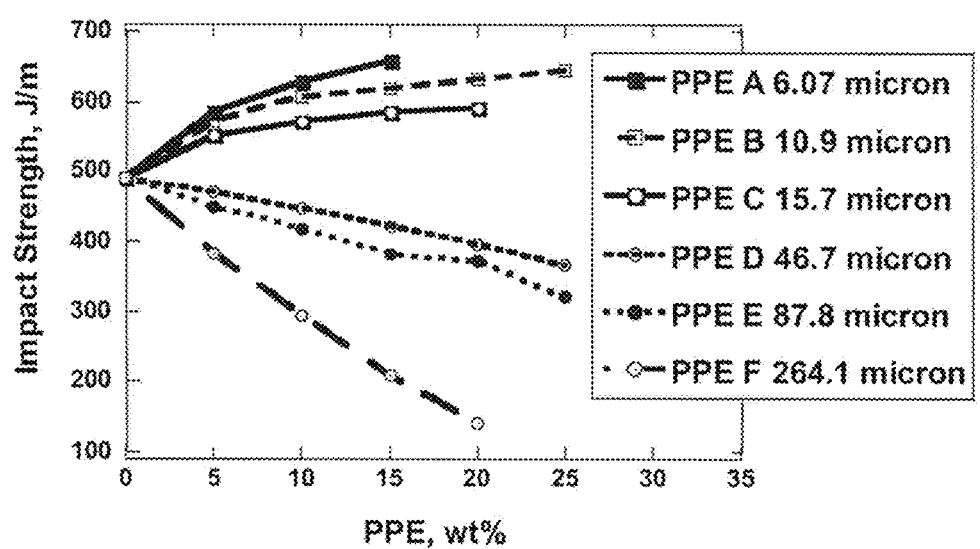
FIG. 9 is a graph of impact strength versus the levels of PPE-A, PPE-B, PPE-C, PPE-D, PPE-E, and PPE-F

From the working examples a summary of the results for impact strength versus PPE levels and particle size is provided in FIG. 9. The effectiveness of ultrafine PPE particles in increasing the toughness of cured epoxy resins. PPE with mean particle sizes of 6.07, 10.9 and 15.7 microns increased the impact strength. At similar PPE levels, the impact strength increased as the mean particle sizes decreased.

However, PPE with mean particle sizes of 46.7, 87.8 and 264.1 microns decreased the impact resistance. At similar PPE levels, the impact strength decreased as the mean particle sizes increased.

Figure 10:
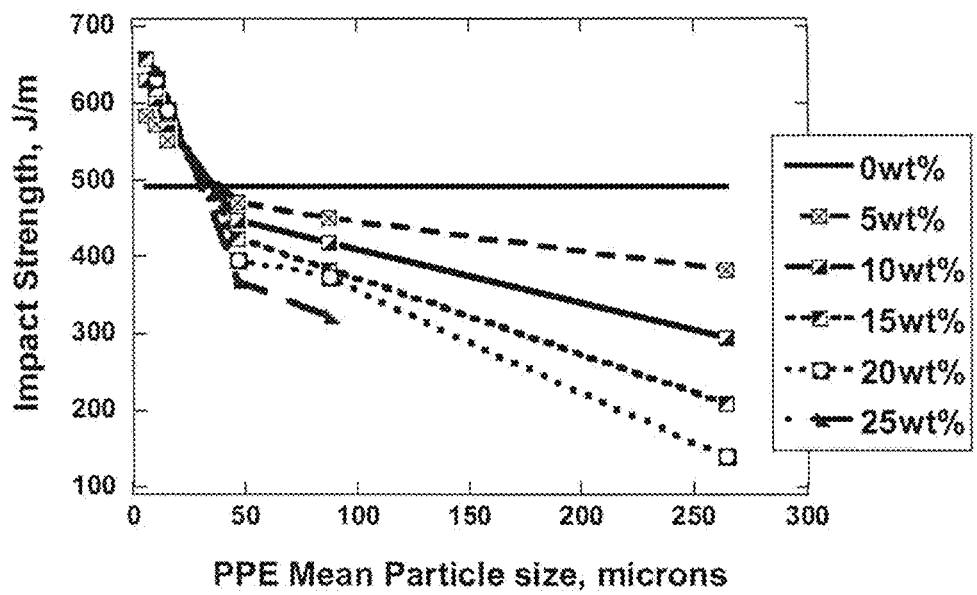
FIG. 10 is a graph of impact strength versus the PPE mean particle size

From the working examples, a summary of the results for impact strength versus mean particle size is provided in FIG. 10. The effectiveness of PPE particles in increasing the toughness of cured epoxy resins increases as the mean particle size decreases. At about a mean particle size of 40 microns the impact strength is equal or greater than the material with no PPE (Comparative Example A).

A summary of the results for post curing 20 weight percent PPE-B is provided in Table 12. Examples 13, 14, and 15 were post cured at 220, 240, and 260° C., respectively. The castings gave increased toughness as measured as impact strength according to ASTM D4812 (Un-notched Izod Impact Test) at relative to the casting Example 2. The impact strength increased with increased post cure temperature. Post curing above the Tg of PPE increases the impact strength.

Figure 11:
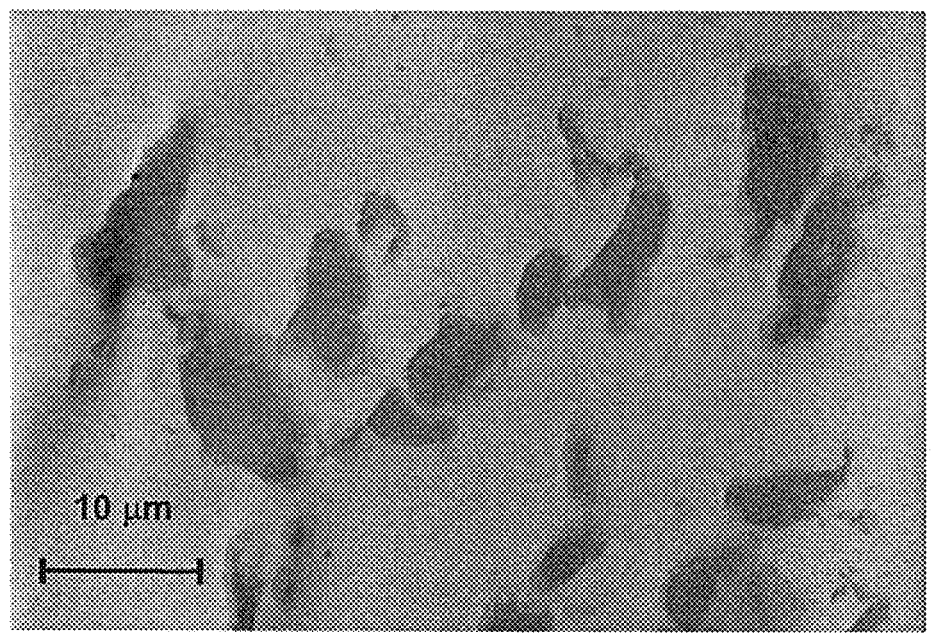
FIG. 11 is a STEM in SEM of 20 wt % PPE-B in a post cured epoxy resin.

The morphology before and after post curing was investigated by scanning transmission electron microscopy using the method previously described. A representative micrograph of Example 2 (no post cure) and Example 14 (with post cure) appear in FIGS. 8 and 11, respectively. The PPE-B is well dispersed in both and there is no indication of agglomeration. The lighter areas around some of the PPE domains suggest possible interaction between PPE domains and epoxy matrix during post curing.

TABLE 12

|  | EX-2 | EX-13 | EX-14 | EX-15 |
|---|---|---|---|---|
| PPE-B Weight Percent | 20 | 20 | 20 | 20 |
| PPE Mean particle size (microns) | 10.8 | 10.8 | 10.8 | 10.8 |
| Post cure temperature, ° C. | None | 220 | 240 | 260 |
| Impact Strength (J/m) | 633 | 723 | 739 | 761 |

General Procedure for Slurries Prepared with Ultrafine PPE for Viscosity Measurements Ultrafine PPE powder was added with mixing to epoxy resin at ambient temperatures. The resultant slurry was placed in a blender to increase the dispersion of PPE in the epoxy resin. The blender used was a Waring explosion proof blender (Model 36BL54) operating at 10,500 rpm. Typical condition was about 30 seconds of bending. The slurry was transferred to a beaker and the spindle viscosity measured using a Brookfield digital spindle viscometer, Model DV-II, following the procedure in its Manufacturing Operation Manual No: m/85-160-G.

General Procedure for Solutions Prepared with PPE for Viscosity Measurements

PPE (0.40 IV) was added to Epon 828 heated to 150° C. PPE (0.40 IV). The PPE dissolved to form a homogeneous solution. The spindle viscosity of the homogeneous solutions was measured using a Brookfield digital spindle viscometer, Model DV-II, following the procedure in its Manufacturing Operation Manual No: m/85-160-G.

Comparative Example P

The amount of PPE dissolved in DGEBPA at 150° C. was 0, 5, 10, 15, 20, and 25 wt %. The effect of the dissolved PPE on spindle viscosity at 150° C. appears in FIG. 12.

Example 16

The amount of PPE-A and PPE-B slurried in DGEBPA at ambient temperatures was 0, 5, 10, 15, 20, and 25 wt %. The effect of the slurried PPE-B and PPE-C on spindle viscosity at 24° C. appears in FIG. 13

Table 13 compares of the percent change in viscosity. Dissolved PPE results in huge increases in viscosity versus slurring the ultra-fine PPE in epoxy.

TABLE 13

Comparison of changes in viscosity

| | Percent Change in Viscosity | | |
|---|---|---|---|
| PPE, wt % | Example B PPE-A | Example B PPE-B | Comparative Example P |
| 5 | 22 | 18 | 155 |
| 10 | 55 | 53 | 621 |
| 15 | 113 | 100 | 1932 |
| 20 | 199 | 177 | 6,800 |
| 25 | 399 | 366 | 19,911 |

Epoxy resins are the workhorses of the electronic industry. Important criteria for good dielectric materials are low dielectric constants (Dk, relative permittivity) and loss tangent (Df, dissipation factor). The effect of ultrafine PPE particles on dielectric properties was measured.

Dielectric constants and dissipation factors were measured at 23° C. according to IPC-TM-650-2.5.5.9. Test samples were in the shape of rectangular prisms having dimensions of 5 centimeters by 5 centimeters by 3.5 millimeters. The samples were conditioned at 23° C. and 50% relative humidity for a minimum of 24 hours before testing. The measuring cell was a Hewlett-Packard Impedance Material Analyzer Model 4291B and had a width of 27.5 centimeters, a height of 9.5 centimeters, and a depth of 20.5 centimeters. The electrodes were Hewlett-Packard Model 16453A and had a diameter of 7 millimeters. Measurements were conducted using a capacitance method sweeping a range of frequency when DC voltage was applied to the dielectric materials. The applied voltage was 0.2 millivolt to 1 volt at the frequency range of 100 megahertz to 1 gigahertz. Values for dielectric constants (Dk, relative permittivity) and loss tangent (Df, dissipation factor) at frequencies of 100 megahertz, 500 megahertz, and 1000 megahertz (1 gigahertz) were recorded and are summarized in Tables 14 and 15, respectively.

TABLE 14

|  | CE-A | Ex-7 | Ex-4 | Ex-2 | Ex-12 |
| --- | --- | --- | --- | --- | --- |
| PPE-B, wt % | 0 | 10 | 15 | 20 | 25 |
| Dielectric constant @ 100 MHz | 3.142 | 3.097 | 3.074 | 3.053 | 3.031 |
| Dielectric constant @ 500 MHz | 3.088 | 3.045 | 3.021 | 2.999 | 2.976 |
| Dielectric constant @ 1000 MHz | 3.065 | 3.022 | 2.998 | 2.976 | 2.952 |

TABLE 15

|  | CE-A | Ex-7 | Ex-4 | Ex-2 | Ex-12 |
| --- | --- | --- | --- | --- | --- |
| PPE-B, wt % | 0 | 10 | 15 | 20 | 25 |
| Loss tangent @ 100 MHz | 0.0171 | 0.0158 | 0.0152 | 0.0146 | 0.0139 |
| Loss tangent @ 500 MHz | 0.0166 | 0.0153 | 0.0147 | 0.0141 | 0.0135 |
| Loss tangent @ 1000 MHz | 0.0162 | 0.0149 | 0.0143 | 0.0137 | 0.0131 |

Water absorption in polymers is known to have adverse effects on dimensional stability, Tg, mechanical properties, and dielectric properties. PPE does not contain polar groups which would strongly hydrogen bond to water molecules, and correspondingly, has very low water absorption. In general, amine cured epoxy resins can contain high levels of hydroxyl groups. A primary amine can generate two hydroxyl groups after reacting the epoxy. These hydroxyl groups can hydrogen-bond with water.

The effect of ultra-fine PPE on water uptake was measured by immersion of samples in deionized water at 80° C. Samples were removed periodically, surface water was blotted off, the samples weighed, and then re-immersed in the water. The results appear in Table 16. There are significant reductions in water absorption with increasing levels of PPE-B.

TABLE 16

|  | CE-A | Ex-7 | Ex-4 | Ex-2 | Ex-12 |
| --- | --- | --- | --- | --- | --- |
| PPE-B, wt % | 0 | 10 | 15 | 20 | 25 |
| Weight increase after 1 day, % | 1.13 | 0.92 | 0.86 | 0.77 | 0.68 |
| Weight increase after 2 days, % | 1.53 | 1.33 | 1.22 | 1.11 | 1.02 |
| Weight increase after 3 days, % | 1.78 | 1.55 | 1.45 | 1.35 | 1.24 |
| Weight increase after 4 days, % | 1.93 | 1.66 | 1.56 | 1.47 | 1.36 |
| Weight increase after 7 days, % | 2.17 | 1.84 | 1.73 | 1.63 | 1.51 |

TABLE 16-continued

|  | CE-A | Ex-7 | Ex-4 | Ex-2 | Ex-12 |
| --- | --- | --- | --- | --- | --- |
| Weight increase after 8 days, % | 2.21 | 1.88 | 1.77 | 1.67 | 1.54 |
| Weight increase after 9 days, % | 2.23 | 1.90 | 1.80 | 1.69 | 1.56 |
| Weight increase after 10 days, % | 2.25 | 1.92 | 1.81 | 1.70 | 1.58 |

Water absorption in polymers can have an adverse effect on dielectric properties. The dielectric properties were measured on samples from the water uptake study. The dielectric constants and loss tangents at 1 GHz after from immersion in water at 80° C. appear in Tables 17 and 18. As the immersion time increased, both dielectric constant and loss tangent increased. However, the samples prepared with PPE-B exhibited a lower increase in dielectric properties. The higher the ultrafine PPE content, the lower the increase in dielectric properties.

TABLE 17

|  | CE-A | Ex-7 | Ex-4 | Ex-2 | Ex-12 |
| --- | --- | --- | --- | --- | --- |
| PPE-B, wt % | 0 | 10 | 15 | 20 | 25 |
| Initial dielectric constant | 3.065 | 3.022 | 2.998 | 2.976 | 2.952 |
| Dielectric constant after 1 day immersion | 3.142 | 3.086 | 3.048 | 3.022 | 2.991 |
| Dielectric constant after 2 days immersion | 3.18 | 3.119 | 3.08 | 3.048 | 3.0154 |
| Dielectric constant after 3 days immersion | 3.207 | 3.144 | 3.103 | 3.071 | 3.033 |
| Dielectric constant after 4 days immersion | 3.23 | 3.159 | 3.121 | 3.084 | 3.044 |
| Dielectric constant after 7 days immersion | 3.267 | 3.186 | 3.145 | 3.105 | 3.063 |
| Dielectric constant after 8 days immersion | 3.276 | 3.193 | 3.149 | 3.109 | 3.068 |
| Dielectric constant after 9 days immersion | 3.282 | 3.197 | 3.153 | 3.112 | 3.07 |

TABLE 18

|  | CE-A | Ex-7 | Ex-4 | Ex-2 | Ex-12 |
| --- | --- | --- | --- | --- | --- |
| PPE-B, wt % | 0 | 10 | 15 | 20 | 25 |
| Initial loss tangent | 0.0162 | 0.0151 | 0.0143 | 0.0137 | 0.0131 |
| Loss tangent after 1 day immersion | 0.0196 | 0.0178 | 0.0165 | 0.0156 | 0.0148 |
| Loss tangent after 2 days immersion | 0.0211 | 0.0193 | 0.018 | 0.0167 | 0.0158 |
| Loss tangent after 3 days immersion | 0.0223 | 0.0203 | 0.019 | 0.0177 | 0.0166 |
| Loss tangent after 4 days immersion | 0.0232 | 0.0209 | 0.0197 | 0.0183 | 0.017 |
| Loss tangent after 7 days immersion | 0.0249 | 0.0221 | 0.0209 | 0.0194 | 0.0179 |
| Loss tangent after 8 days immersion | 0.0251 | 0.0224 | 0.0212 | 0.0197 | 0.0181 |
| Loss tangent after 9 days immersion | 0.0254 | 0.0226 | 0.0214 | 0.0199 | 0.0183 |

As demonstrated by the working examples, impact resistance is improved, dielectric properties are lowered, and water adsorption is reduced, relative to existing epoxy resin compositions. The advantageous properties of the cured compositions make them ideally suited for forming certain articles.

The curable compositions are particularly well suited for use in electronic applications such as encapsulants, adhesives, resin coated copper, prepregs, and printed circuit boards. In addition, the curable compositions are particularly well suited for use in structural composites, industrial adhesives, and coatings.

The foregoing invention has been described in some detail by way of illustration and example for purposes of clarity and understanding. The invention has been described with reference to various specific embodiments and techniques. It should be understood that many variations and modifications may be made while remaining within the spirit and scope of the invention. It will be obvious to one of skill in the art that changes and modifications may be practiced within the scope of the appended claims. The above description is intended to be illustrative and not restrictive. The scope of the invention should, therefore, be determined not with reference to the above description, but should instead be determined with reference to the following appended claims, along with the full scope of equivalents to which such claims are entitled. All patents, patent applications, and publications cited in this application are hereby incorporated by reference in their entirety for all purposes to the same extent as if each individual patent, patent application, or publication were so individually denoted.

The invention claimed is:

1. A composition comprising:
 (a) 10 to 40 percent by weight of ultrafine particulate poly(2,6-dimethyl-1,4-phenylene ether) having an intrinsic viscosity of 0.4 deciliters per gram, measured in chloroform at 25° C., wherein the mean particle size of the ultrafine particulate poly(2,6-dimethyl-1,4-phenylene ether) is 6 to 16 microns;
 (b) 60 to 90 percent by weight of an epoxy resin, which is the diglycidyl ether of bisphenol A (DGEBPA):
 (c) 5 to 25 percent by weight of a hardener; wherein:
 the weight percents are based on the total weight of the composition;
 the impact strength of the composition is greater than or equal to 500 J/m as measured by ASTM D4812;
 the ultrafine particulate poly(2,6-dimethyl-1,4-phenylene ether) is dispersed in the composition and remains dispersed in the composition post-cure and the composition exhibits discrete phases and exhibits two glass transition temperatures (Tg) measured by differential scanning calorimetry at 30 to 250° C. under a nitrogen atmosphere with a heating rate of 20° C./min; and
 the composition has increased toughness as measured by ASTMD4812 as compared to a composition comprising poly(phenylene ether) (PPE) particles having a size that is larger than 16 microns, epoxy resin, and a hardener, wherein the poly(phenylene ether) particles are not dissolved in the epoxy resin.

2. The composition of claim 1, wherein the hardener is 4,4'-diaminodiphenyl methane.

3. The composition of claim 1, wherein the ultrafine particulate poly(2,6-dimethyl-1,4-phenylene ether) has a mean particle size of 6 to 10 microns.

4. The composition of claim 1, wherein the ultrafine particulate poly(2,6-dimethyl-1,4-phenylene ether) has a mean particle size of 11 to 16 microns.

5. A composition, comprising:
 (a) 15 to 35 percent by weight of ultrafine particulate poly(2,6-dimethyl-1,4-phenylene ether) having an intrinsic viscosity of between 0.4 deciliters per gram, measured in chloroform at 25° C., wherein the mean particle size of the ultrafine particulate poly(2,6-dimethyl-1,4-phenylene ether) is 6 to 16 microns;
 (b) 60 to 90 percent by weight of an epoxy resin, wherein the epoxy resin is the diglycidyl ether of bisphenol A (DGEBPA); and
 (c) 5 to 25 percent by weight of a hardener, wherein the hardener is 4,4'-diaminodiphenyl methane;
 wherein the impact strength of the composition is greater than or equal to 500 J/m as measured by ASTM D4812; and
 wherein the ultrafine particulate poly(2,6-dimethyl-1,4-phenylene ether) is dispersed in the composition and remains dispersed in the composition post-cure and the composition exhibits discrete phases and exhibits two glass transition temperatures (Tg) measured by differential scanning calorimetry at 30 to 250° C. under a nitrogen atmosphere with a heating rate of 20° C./min.

6. An article, comprising:
 (a) 15 to 35 percent by weight of ultrafine particulate poly(2,6-dimethyl-1,4-phenylene ether) having an intrinsic viscosity of between 0.30 deciliters to 1.5 deciliters per gram, measured in chloroform at 25° C., wherein the particle size of the ultrafine particulate poly(2,6-dimethyl-1,4-phenylene ether) is 6 to 16 microns;
 (b) 40 to 70 percent by weight of an epoxy resin, wherein the epoxy resin is the diglycidyl ether of bisphenol A (DGEBPA); and
 (c) 5 to 25 percent by weight of a hardener, wherein the hardener is 4,4'-diaminodiphenyl methane;
 wherein the article has a density distribution of less than or equal to 0.1 percent and an impact strength that is greater than or equal to 500 J/m as measured by ASTM D4812.

7. A composition comprising:
 (a) 10 to 40 percent by weight of ultrafine particulate poly(2,6-dimethyl-1,4-phenylene ether) having an intrinsic viscosity of between 0.30 deciliters to 0.6 deciliters per gram measured in chloroform at 25° C. and having a number average molecular weight of about 16,000 to about 25,000 atomic mass units, wherein the mean particle size of the ultrafine particulate poly(2,6-dimethyl-1,4-phenylene ether) is 6 to 16 microns;
 (b) 60 to 90 percent by weight of an epoxy resin, which is the diglycidyl ether of bisphenol A (DGEBPA):

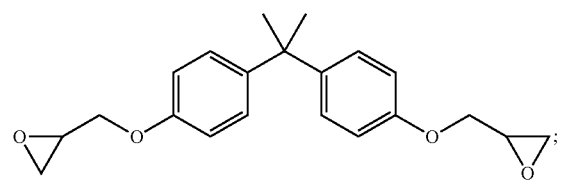 [SMILES: CC(C)(c1ccc(OCC2CO2)cc1)c1ccc(OCC2CO2)cc1]

(c) 5 to 25 percent by weight of a hardener which is 4,4'-diaminodiphenyl methane; wherein:
 the weight percents are based on the total weight of the composition;
 the ultrafine particulate poly(2,6-dimethyl-1,4-phenylene ether) is dispersed in the composition and remains dispersed in the composition post-cure and the composition exhibits discrete phases and exhibits two glass transition temperatures (Tg) measured by differential scanning calorimetry at 30 to 250° C. under a nitrogen atmosphere with a heating rate of 20° C./min;
 the impact strength of the composition is greater than or equal to 500 J/m as measured by ASTM D4812; and
 the composition has improved toughness as measured by ASTMD4812 as compared to compositions having a size that is larger than 16 microns, epoxy resin, and a hardener, wherein the poly(phenylene ether) particles are not dissolved in the epoxy resin.

* * * * *